March 26, 1974 C. M. COLEMAN 3,799,742
MINIATURIZED INTEGRATED ANALYTICAL TEST CONTAINER
Filed Dec. 20, 1971 6 Sheets-Sheet 1

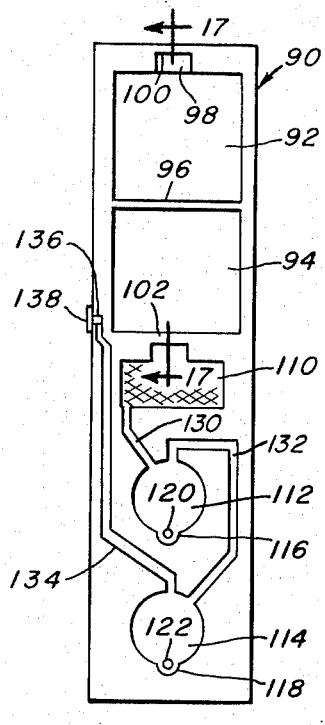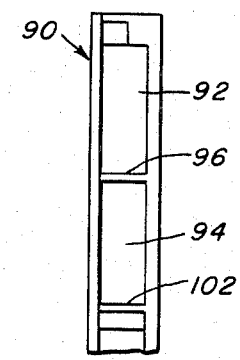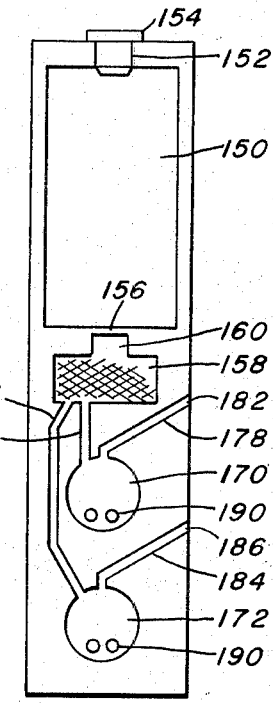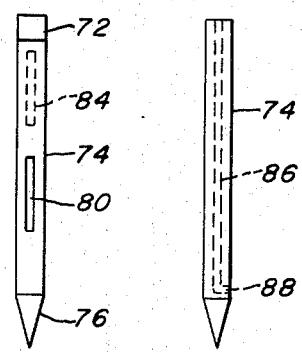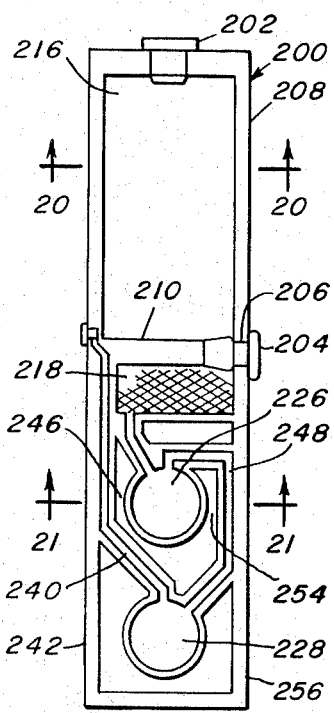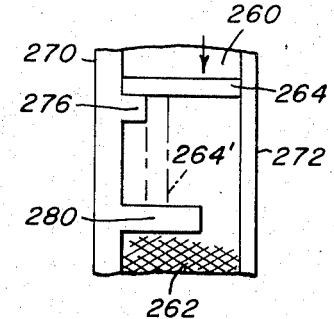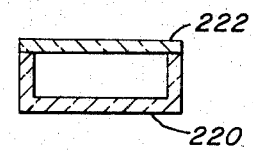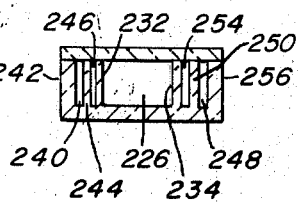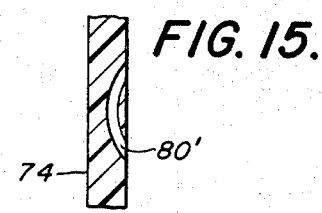

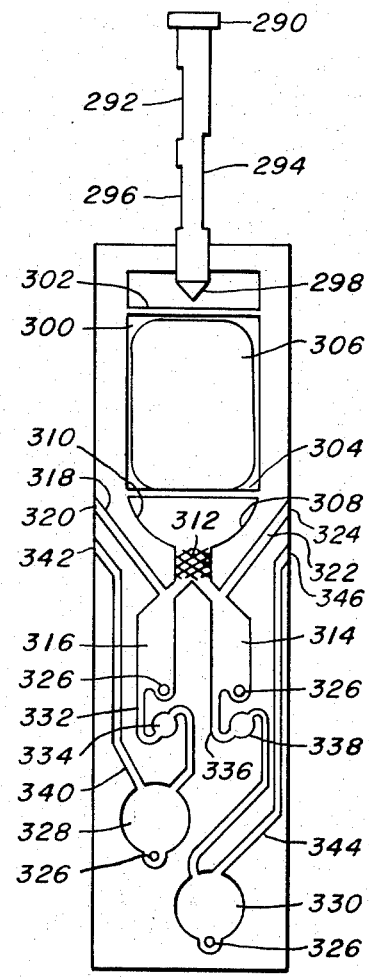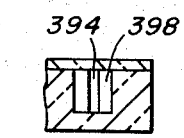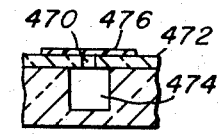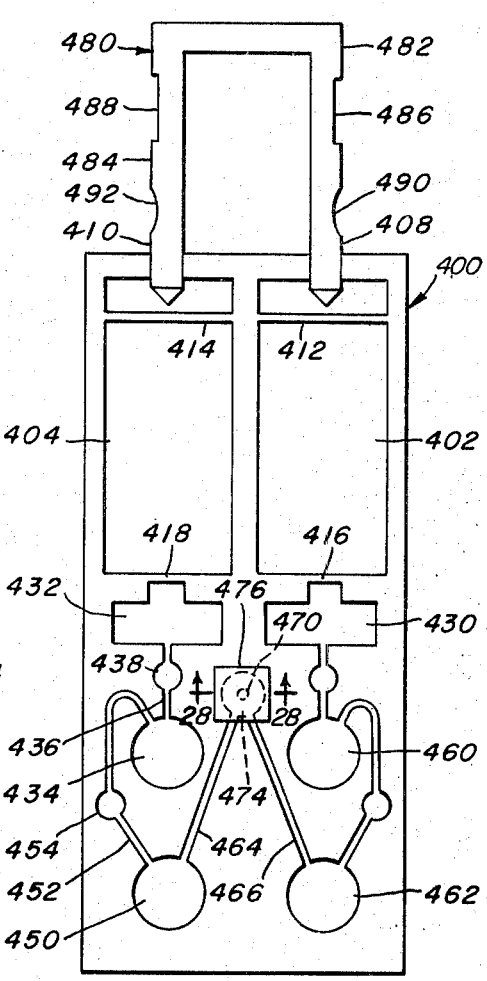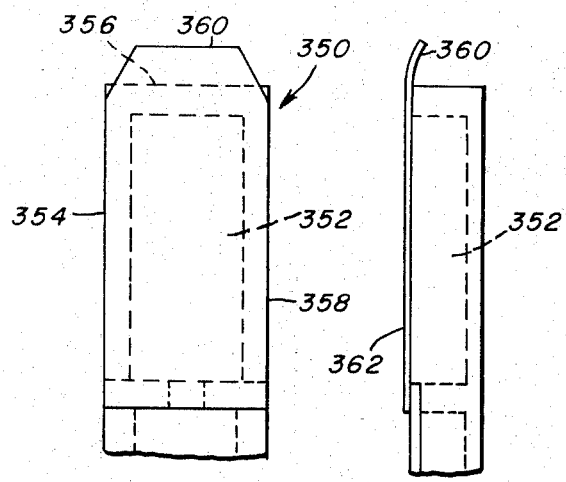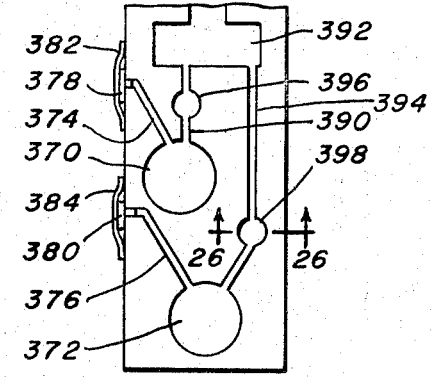
FIG. 22.   FIG. 26.   FIG. 28.   FIG. 27.   FIG. 23.   FIG. 24.   FIG. 25.

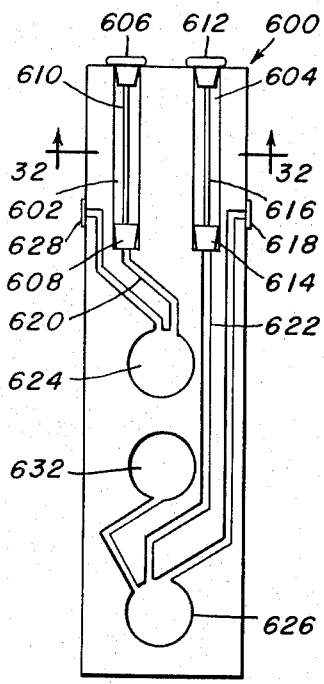
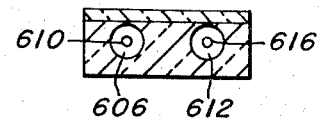
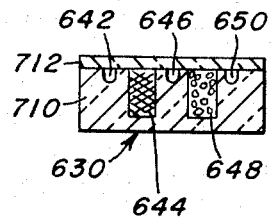
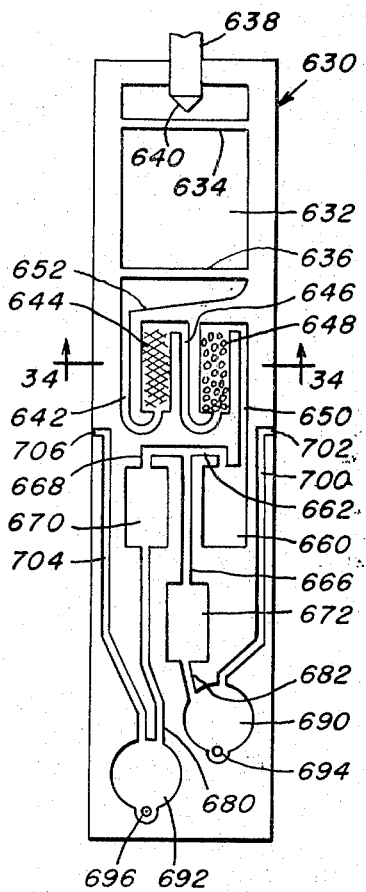
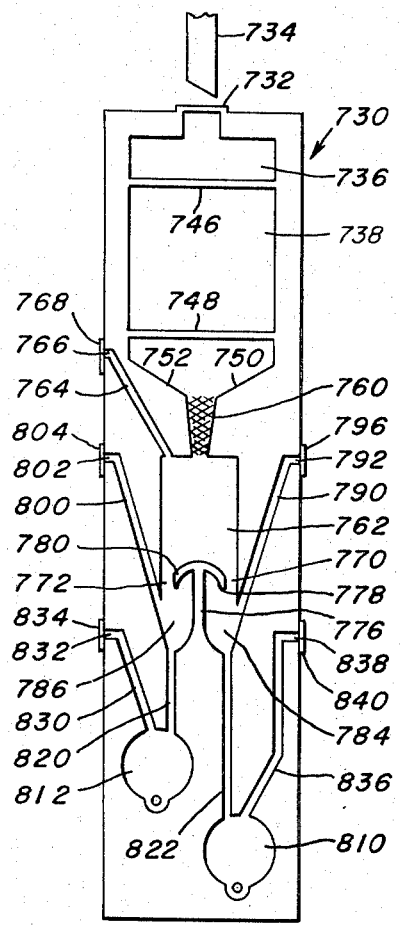

United States Patent Office 3,799,742
Patented Mar. 26, 1974

799,742
MINIATURIZED INTEGRATED ANALYTICAL
TEST CONTAINER
Charles M. Coleman, 958 Washington Road,
Pittsburgh, Pa. 15228
Filed Dec. 20, 1971, Ser. No. 209,884
Int. Cl. G01n 33/00, 33/16
U.S. Cl. 23—253 R
89 Claims

ABSTRACT OF THE DISCLOSURE

An analytical test container having a reception chamber for receipt of a specimen. First passageway means connecting the container interior with the container exterior. First seal means disposed between the reception chamber and the container exterior. A separation chamber which may be a filtration chamber. Second seal means separating the reception chamber from the separation chamber. A first cuvette and a second cuvette. Conduit means for permitting flow from the separation and/or reaction chamber to the first and second cuvettes. Vent means communicating with at least one cuvette.

The first seal means may be a closure element in the form of an elongated rod having a closure sector adapted to close the first passageway means. The rod may have piercing means for destroying the integrity of the second seal means. The rod may also have specimen measuring and delivering recesses and a venting channel.

The conduit means for permitting flow from the separation chamber or reaction chamber to the first and second cuvettes may involve either sequential filling or parallel filling. Mixing means may be provided in the reception chamber and first and second cuvettes in order to facilitate admixture of the specimen and reagent materials.

Multiple systems for simultaneously running a standard and a test procedure or multiple testing procedures may be employed.

Serial reaction chambers for effecting immunologically based titrations may be provided in a modified form of container structure.

BACKGROUND OF THE INVENTION

Field of the invention

This invention relates to miniaturized unitary analytical test containers and, more specifically, the invention relates to such containers which have a miniaturized unitary structure including means for performing a wide range of analytical tests on a wide range of specimens.

Description of the prior art

With the tremendous advances which have been made in medical science in recent years, there has been an ever increasing need for clinical laboratory testing. As a result, the number of clinical laboratory tests performed in a given year have been increasing at a very rapid rate. Not only have a greater number of the more conventional tests been performed in order to provide improved information employed in the medical diagnosis and treatment of illnesses, but also new test procedures and greater accuracy in existing procedures have resulted.

The net result of all of this progress is that hospital clinical laboratories have been inundated with requests for testing and have found it difficult to comply with the demands. One of the difficulties stems from the fact that for many of the tests skilled or semi-skilled personnel are required. Secondly, in view of the fact that the test results may influence life and death decisions, only people of suitable maturity and responsibility may be employed in such installations. While in some areas computerized testing has helped to relieve the burden upon hospital and other clinical laboratories, such equipment is extremely expensive and is employed primarily in connection with only certain forms of testing.

One of the disadvantageous results of the increase in volume of tests is the fact that there frequently is a substantial delay between delivery of the specimen to the laboratory and return of the test results to medical personnel. In addtion, there remains an ever increasing need in terms of accuracy of results and maintaining acceptable economy in such procedures.

It has been known to suggest the use of prepackaged reagent materials which communicate with control chambers adapted for the admixture of the reagent and test specimen. See, for example, U.S. Pats. 3,476,515, 3,477,821, 3,477,822 3,480,398, 3,480,399, 3,497,320 and 3,504,376. Some of these disclosures suggest the use of the control chamber as an optical chamber for evaluating the test results. Other efforts to expedite testing by prepackaging are disclosed in U.S. Pats. 3,449,081, 3,480,400 and 3,582,285. U.S. Pat. 3,582,285, which is the most recent of the group of patents referred to and was issued to the same inventor as some of the patents recited above, discloses a prepackaged unit which requires independent means for moving reagents from a first group of pockets and transferring them to reaction chambers.

There remains, therefore, a great need for an integrated miniaturized unitary test container which will provide an economic means of obtaining rapid and accurate analytical test results for a wide range of specimens and a wide range of analytical tests. There remain a further need for such a container which may be accurately employed by unskilled personnel. There remains yet additional needs for a container which is adapted for use in operating rooms, intensive care units, locations of emergencies, the patient's bedside and at doctors' offices as well as in the home in order that the tests may be rapidly performed and completed in the presence of the patient.

SUMMARY OF THE INVENTION

The above-described needs have been met by the integrated analytical test containers of this invention. The analytical test containers of this invention employ a modular structure which can be used in a number of conventional test procedures and can be modified for use with other test procedures.

The analytical test container of this invention has a reception chamber for receipt of a specimen and first passageway means connecting the container interior with the container exterior. First seal means prevent communication between the reception chamber and the container exterior. A separation chamber, which may be a filtration chamber, is disposed adjacent the reception chamber and separated therefrom by second seal means. Intermediate stage reaction chambers may be interposed if reactions in stages are desired. First and second cuvettes are defined within the test container. Conduit means are provided to permit flow from the separation chamber to the first and second cuvettes and vent means communicate with at least one cuvette. Conduit means may provide for sequential flow from the separation chamber to the first cuvette and subsequently from the first cuvette to the second cuvette. Alternatively, conduit means may provide independent passageways connecting the separation chamber with the first and second cuvettes. Mixing means, preferably in the form of inertly covered high density elements, may be provided in the reception chamber and cuvettes.

A uniquely configurated rod-like closure may be employed as all or part of the first seal means. The rod is preferably provided with seal displacing or fracturing means at the inner free end. In addition, it may be provided with a recess or passageway which will receive a predetermined volume of a specimen. Also, a vent channel may be provided in order to permit sequential flow of the fluid specimen through the container while the rod is inserted within the container.

It is an object of this invention to provide an integrated unitary analytical test container which has miniaturized interconnected mixing, reagent storing, separating, reacting and testing chambers.

It is another object of this invention to provide such test containers which may be economically manufactured, provide flexibility of use in a wide range of environments apart from clinical laboratories and provide rapid and accurate test results.

It is another object of this invention to provide such analytical test containers which are disposable and are adapted to be used by unskilled, as well as semi-skilled and skilled, individuals.

It is yet another object of this invention to provide such test containers which are adapted for use in a wide range of tests on a great variety of specimens under contamination-free conditions.

These and other objects of the invention will be more fully understood from the following description of the invention, on reference to the illustrations appended hereto.

BRIEF DESCRIPTION OF THE DRAWINGS

FIG. 14 is a side elevational view of the closure of FIG. 9.

FIG. 14a is a fragmentary view of the vent structure shown in FIG. 13a.

FIG. 15 is a fragmentary cross sectional view of a closure rod having a modified form of specimen receiving recess.

FIG. 16 is a partially schematic front elevational view of a modified form of test container of this invention.

FIG. 17 is a cross sectional view of the test container of FIG. 16 taken through 17—17.

FIG. 18 is a front elevational view of a modified form of analytical test container of this invention employing parallel flow to cuvettes.

FIG. 19 is a front elevational view of a modified form of analytical test container of this invention employing a modified form of closure means.

FIG. 19a is a fragmentary illustration showing a modified form of filtration chamber seal.

FIG. 20 is a cross sectional illustration of the reception chamber of the analytical test container of FIG. 19 taken through 20—20.

FIG. 21 is a cross sectional illustration taken through 21—21 of FIG. 19.

FIG. 22 is a front elevational view of a modified form of analytical test container of this invention employing separate reaction chambers and depot reagent reservoirs.

FIGS. 23 and 24 illustrate a fragmentary front elevational view and a fragmentary side elevational view, respectively, of a modified form of container structure having a different means of gaining access to the reception chamber.

FIG. 25 is a fragmentary elevational view of the lower portion of a modified form of analytical test container of this invention.

FIG. 26 is a cross sectional view showing a depot reagent reservoir taken through 26—26 of FIG. 25.

FIG. 27 is a front elevational view of a modified form of analytical test container which is a multiple container having duplicate processing structures.

FIG. 28 is a partial cross sectional view showing venting arrangement of the multiple container of FIG. 27 taken through 28—28.

FIG. 31 illustrates a front elevational view of a modified form of test container adapted to process both test and standard specimens.

FIG. 32 is a cross sectional view showing the reception chambers of the container of FIG. 31 taken through 32—32.

FIG. 33 is a front elevational view of a modified form of test container adapted for use in enzyme tests.

FIG. 34 is a cross sectional view of the container of FIG. 33 showing the filtration chamber and ion exchange bed.

FIGURE 35 is a front elevational view of a modified form of test container having a number of processing chambers.

DESCRIPTION OF THE PREFERRED EMBODIMENTS

The term "cuvette" as used herein shall refer to an optical cell chamber defined within an analytical test container of this invention.

The miniaturized integrated analytical test containers of this invention are adapted for use in a broad range of tests including tests for blood glucose, urea, uric acid, blood alcohol, bilirubin, total protein, albumin, hepatitis, enzymes, ketones, silicates, lactic dehydrogenase, hemoglobin, triglycerides, pregnancy, phosphate, calcium, cholesterol, fibrinogen, immunological tests and a wide range of additional tests. Also, the integrated analytical test containers of this invention are adapted to be employed with a wide range of human and animal specimens including blood, urine, milk, saliva, sweeat, spinal fluid, amniotic fluid, feces, renal stones and other biological and non-biological materials. While in the interest of simplicity and clarity of disclosure the description of each of the structural embodiments will frequently include illustrative examples of specific tests, it will be appreciated that the invention is not so limited and may be employed in a very wide range of analytical tests.

Figure 2:
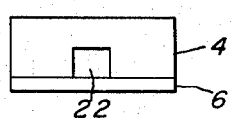
FIG. 2 is a top plan view of the analytical test container of FIG. 1.
Figure 1:
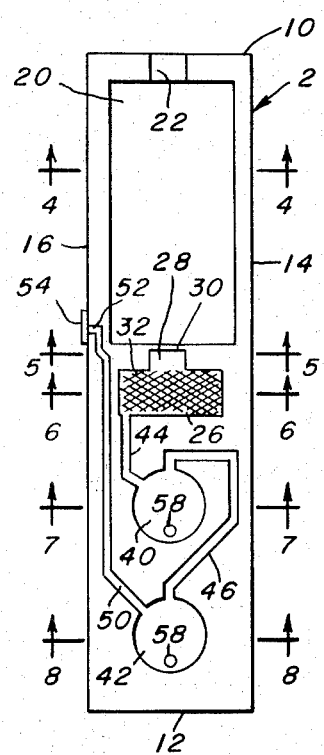
FIG. 1 is a partially schematic front elevational view of one from of integrated analytical test container of this invention.
Figure 3:
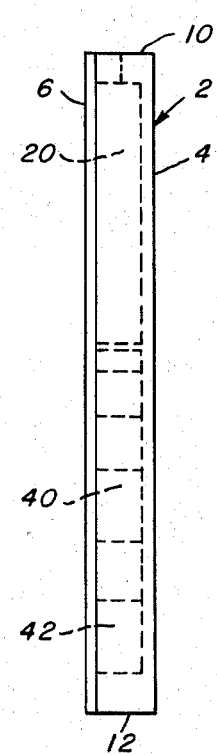
FIG. 3 is a side elevational view of the analytical test container of FIG. 1.

Referring now more specifically to FIGS. 1 through 3, a preferred embodiment of the invention will be considered. In the form shown in these drawings the analytical test container has an elongated body 2 which is preferably composed of a substantially rigid clear plastic material. The elongated body 2, in the form shown, consists of a tray portion 4 and a cover portion 6. The tray portion 4 defines a plurality of specific openings, chambers and passageways which will be defined in greater detail below. The cover portion 6 is preferably a plastic film (but may be composed of other materials such as glass in the form of a microscope slide) which is joined to the tray portion 4. Joinder may be effected by a suitable adhesive or by cohesive bonding, such as heat sealing or ultrasonic bonding or other suitable bonding means. The cover portion 6 cooperates with the tray portion 4 to provide closed chambers within the elongated container body 2. The container body 2 has an upper end 10, a lower end 12 and connecting sides 14, 16. In the form shown the elongated container body 2 has a substantially rectangular outer periphery.

The container body 2 defines a reception chamber 20 which, in the form shown, is disposed closely adjacent upper end 10. A passageway 22 extends through end wall 10 and connects the reception chamber 20 with the exterior of the container. The reception chamber 20 will generally be provided with one or more reagent materials during completion of fabrication of the test container.

In initiating use of the miniaturized test container, access to the reception chamber 20 is obtained through passageway 22 after removal or destruction of the passageway seal or closure (not shown in this view). The specimen is thoroughly admixed with the reagent material or other chemical materials in the reception chamber 20 in order to provide the desired dilution and/or establish a desired precipitate.

Separation chamber 26, which in the form shown is a filtration chamber, is disposed adjacent the reception chamber 20 and is connected therewith by means of passageway 28. It is noted that a seal in the form of a molded integrally formed membrane 30 closes passageway 28 prior to completion of mixing of the specimen and reagent materials in the reception chamber 20. The seal 30 is then fractured either by application of a compressive fracturing force by means of the hands of the user or other independent means such as by an independent tool. This permits the test fluid to flow into the separation chamber 26. In the form of separation chamber 26 shown in FIG. 1 the filter material 32 is an efficient mesh filter such as a glass wool having rather fine filaments which cause rapid liquid filtration combined with excellent retention of small particles such as blood cells and fibrin.

Disposed at positions below the separation chamber 26 are the first cuvette 40 and second cuvette 42. The filtered test fluid emerging from separation chamber 26 will flow through fluid conduit 44 into first cuvette 40. Fluid conduit 46 emerges from the upper portion of first cuvette 40 and is connected with the upper portion of second cuvette 42. In addition, it is noted that exhaust vent conduit 50 is connected with the upper portion of second cuvette 42 and communicates with the container exterior at openings 52 in sidewall 16. A closure member, which in the form shown is strippable tape or film 54, is removed to establish communication between the container exterior and second cuvette 42. In the form shown the vent opening 52 is positioned at a level above the bottom of reception chamber 20 in order to resist undesired discharge of the test fluid from cuvette 42 into vent conduit 50. If desired, the vent may be disposed at a level equal to or below the lower portion of reception chamber 20. With such a vent position, it is preferred to provide a vent closure composed of a membrane which is permeable to air but impermeable to liquid.

The first and second cuvettes 40, 42 may be prepackaged with materials such as dry reagent materials which are mixed with the filtered test fluids in the cuvettes 40, 42. (In the interest of clarity of illustration, the reagent materials have not been shown in reception chamber 20 or cuvettes 40, 42, but it will be appreciated that they may be provided in the desired proportionate quantities in accordance with conventional or desired test procedures and will be introduced into the respective chambers during manufacture and/or use of the analytical test containers.)

In order to facilitate mixing of the test fluid with the reagent material contained in the first and second cuvettes 40, 42 it is preferred to provide prepackaged inert mixing means within the cuvettes 40, 42 and reception chamber 20. In the form illustrated, a number of inertly covered lead elements 58 in the shape of spheres are provided. The high density of lead is preferred in the miniaturized system as it provides the maximum turbulence to facilitate excellent mixing efficiency, while occupying a small volume. This facilitates rapid mechanical agitation of the chamber contents which results in the desired efficient dissolving of the dry or concentrated stored material. Alternatively, the containers may be agitated to effect the desired homogenization without the use of such mixing means. Also, magnetic mixing means (which are adapted to be used with an exteriorly generated magnetic field), transducers or mechanical vibrators, for example, may be employed.

Figure 4:
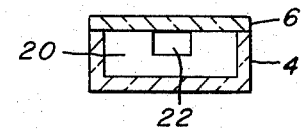
FIG. 4 is a cross sectional illustration of the analytical test container of FIG. 1 taken through 4—4.
Figure 5:
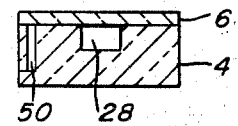
FIG. 5 is a cross sectional illustration of the analytical test container of FIG. 1 taken through 5—5.
Figure 6:
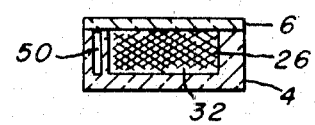
FIG. 6 is a cross sectional illustration of the analytical test container of FIG. 1 taken through 6—6.
Figure 7:
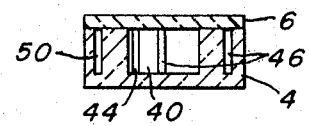
FIG. 7 is a cross sectional illustration of the analytical test container of FIG. 1 taken through 7—7.
Figure 8:
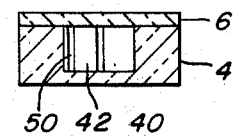
FIG. 8 is a cross sectional illustration of the analytical test container of FIG. 1 taken through 8—8.

Referring now to FIG. 4 through 8, the various sections of the container body 2 will be considered in greater detail. FIG. 4 shows the reception chamber 20 which may be provided with a volume capacity in accordance with the needs of the particular test with which it will be employed. It will be noted that variations in volume may be readily effected by either reducing the length of the chamber 20 or reducing the depth or width of the same. In FIG. 5 there is shown the passageway 28 which connects the reception chamber 20 with the separation chamber 26. FIG. 6 shows a portion of exhaust vent 50 and the separation chamber 26 with the filter material 32 contained therein. FIG. 7 shows exhaust vent conduit 50 and the fluid conduit 46 which connects the first cuvette 40 with the second cuvette 42. Also shown is the first cuvette 40. FIG. 8 is a cross sectional view showing the second cuvette 42 which is preferably provided with substantially the same volume as the first cuvette 40.

In manufacturing the test container of this invention, a wide range of materials may be employed in order to provide an economically and functionally suitable manufacturing process and resultant product. In a preferred form of the invention the tray portion 4 may be composed of plastic and unitarily molded as by means of injection molding or other thermoforming procedures. An advantageous means of fabricating such a mold is by a chemical milling process. Another preferred method of manufacturing the tray is to provide a plastic web which has preformed openings and relief and securing such web to an underlying continuous plastic web to establish a tray having the desired compartments and conduits defined therewithin. While the various chambers and conduits could be separately fabricated and secured within the container, this is economically and technically disadvantageous as compared with the preferred methods of manufacture. Among the preferred materials for use in manufacture of the container body are the transparent plastic resins selected from the group consisting of polystyrenes, ionomer, resins, polycarbonates, cellulose esters, styrene-acrylonitrile copolymers, polysulfones, vinyls, methyl-pentene polymers, polyolefins, acrylics and polymers or copolymers thereof. Also, if desired, glass or thermosetting materials, such as epoxies, for example, may be employed. In addition, the materials may be treated to alter surface properties as by improving wettable characteristics of hydrophobic surfaces by surfactant treatment, or superficial oxidation, for example.

After the tray 4 has been fabricated, the desired reagent and other chemical materials are introduced in predetermined quantities into the reception chamber 20 and the cuvettes 40, 42. The reagents or other chemicals may conveniently be added by suitable metering or dispensing means. The materials may be introduced by pumps for liquids or semi-solids. Alternatively, precision printing means might be employed to provide the desired pattern and quantity of the materials. Addition of dry materials may be effected by metered delivery on the basis of weight or volume, including the use of tablets, if desired.

The filter material 32, in the form of separation chamber 26 shown in FIG. 1, is introduced into chamber 26. Mixing means 58 are also inserted. The container is then ready for securement of cover portion 6. The cover portion may be composed of any of the materials mentioned above for use in connection with the container body regardless of the material of the particular container body being employed with the cover. The cover may be conveniently bonded to the tray portion 4 in order to provide effective closure of the various portions of the test container, apart from passageway 22 which will be discussed below.

A graduated scale, test standards, coded information, patient identity space or other information may be provided directly on the container body and/or cover or by means of separate materials secured to or associated with the container.

One of the advantages of the invention is that it provides a miniaturized fully integrated test structure. The miniaturization not only facilitates storage of the integrated analytical test container in minimum space, but also improves the economics of employing such a disposable system as only very small quantities of reagent materials, some of which are rather expensive, need be provided. This reduction in quantity of reagent material is effected, however, without any impairment of the accuracy of the test results. In the form of container of this invention, the single modular container, as opposed to multiple containers to be described below, will generally have a length of about 3 to 21 centimeters (preferably about 4 to 12 centimeters), a preferred width of about 8 to 25 millimeters and a preferred thickness of about 2 to 15 millimeters. While in the preferred form the test container will have an elongated substantially rectangular configuration and this is preferred in terms of ease of manufacture, handling and storage, other configurations such as oval or circular peripheral configurations may be employed if desired.

Figure 10:
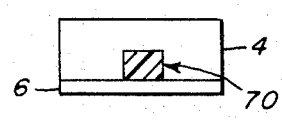
FIG. 10 is a cross sectional illustration showing the closure seal taken through 10—10 of FIG. 9.
Figure 9:
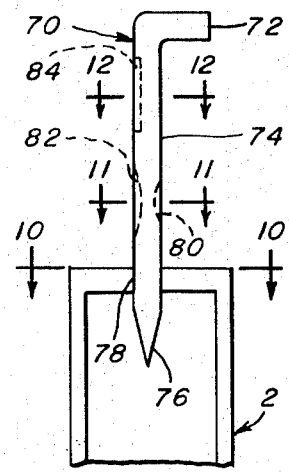
FIG. 9 is a fragmentary elevational view showing a preferred form of closure employed with this invention.

Referring now to FIGS. 9 and 10, a preferred form of closure element 70 of this invention will be considered. The closure element 70 has a handle portion 72 and a shank portion 74. The inner free end of the shank portion 74 has piercing means 76 which in the form shown is a pointed free end. The piercing means 76 is adapted to be employed in fracturing seal membrane 30 of passageway 28 after speiimen mixing has been accomplished in reception chamber 20 in order to permit the test fluid to enter separation chamber 26. As is shown in FIG. 10, a seal portion 78 of the closure shank has a cross sectional configuration which is complementary to that of passageway 22 and is adapted to engage the surface which defines passageway 22 in frictional sealing engagement. (If desired, seal portion 78 and/or passageway 22 may be covered with a suitable sealing material to facilitate improved sealing.) The closure element may be employed as the primary seal between the reception chamber 20 and the container exterior. If desired, however, supplemental or alternate sealing means may be provided.

Figure 11:
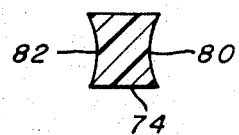
FIG. 11 is a cross sectional illustration showing a portion of the body of the closure taken through 11—11 of FIG. 9.

Referring now to FIGS. 9, 11 and 15, another feature of the closure element 70 will be considered. The form of closure element 70 shown in these figures is provided with two outwardly open specimen receiving openings 80, 82. Opening 80 is adapted to receive a precise predetermined quantity of a test specimen such as blood, for example. Recess 82 is similarly adapted, but has a different capacity from that of 80. In some instances it may be desirable to render a hydrophobic recess surface hydrophilic in order to facilitate filling with the liquid specimen. If desired, only one specimen receiving opening 80, 82 may be provided or a number of the same may be provided. In use with connection with blood, the user may effect a small puncture opening in a finger, fill an opening 80, 82 with the extravasated capillary blood from the finger puncture and move the closure element 70 downwardly into the test container. Should excess specimen remain on the exterior of the shank 74, the walls which define passageway 22 will serve to wipe the excess off the shank 74 and permit introduction of only the predetermined quantity. An alternate form of specimen receiving recess which is adapted for introducing a precise quantity of capillary blood is shown in FIG. 15. In this form the recess 80' takes the form of an elongated passageway which has opposed ends communicating with the surface of shank 74. To assist liquid specimen entry controlled vacuum means may be connected to one end of the elongated passageway.

Figure 12:
FIG. 12 is a cross sectional illustration showing the closure vent recess taken through 12—12 of FIG. 9.
Figure 13:
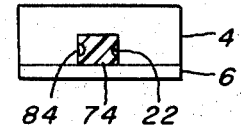
FIG. 13 is a sectional view similar to FIG. 10, but showing the vent portion of the closure positioned in the container passageway.

Referring to FIGS. 1 and 6 it will be appreciated that once mixing of the dry or fluid reagent material with the specimen has been effected within reception chamber 20, piercing means 76 may be employed to fracture seal membrane 30. This permits the test liquid to flow under the influence of gravity downwardly into separation chamber 26. In order to facilitate such flow without withdrawing closure element 70 and thereby exposing the mixed test fluid to the surrounding atmosphere, the shank 74 is provided with an outwardly open vent recess 84 such that an opening through passageway 22 will be retained for venting purposes when the closure shank 74 is inserted in the container to the desired depth. A detail of this structure is shown in FIGS. 12 and 13. The relative position of the vent recess 84 on shank 74, in the preferred form, is shown in FIG. 14.

Figure 13A:
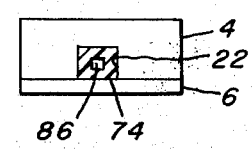
FIG. 13a is a sectional view similar to FIG. 13, but showing a modified form of vent.

Another form of closure vent is shown in FIGS. 13a and 14a wherein the vent takes the form of an internal passageway 86 having an opening 88 communicating with the surface of the shank to permit venting through the body of the shank 74. If desired, the upper vent opening may be connected to a pressure source to facilitate liquid flow within the container. Such pressure systems are particularly useful to accelerate flow when viscous fluids are present, when improved filter performance is desired, to alter surface tension effects and for similar needs.

Another feature of the handle 72 in addition to facilitating manual engagement for operation of the closure element 70 is that it serves as a stop member which will engage upper end 10 of the elongated body 2 and prevent undesired excess entry of the closure element 70 into the interior of the elongated body. While the handle 72 advantageously serves this dual purpose, if desired independent stop means may be provided or a closure of this type devoid of either handles or stops may be used.

In general, the closure element 70 may be composed of any suitable material including glass, plastic or rubber. It will generally be most convenient and preferable to employ one of the above enumerated materials preferred for use in molding the tray portion 4. In fact, an advantage of such use is that the closure element may be molded simultaneously with the tray portion 4 with frangible connecting bridges being employed to secure the tray portion 4 to the closure element 70. This would obviate the need for separate manufacturing, handling and assembly of the tray portion 4 and closure element 70.

EXAMPLE 1

In order to illustrate one mode of practice of the invention, an example of the use of the miniaturized test container in testing for blood glucose will be provided. A test container of the type shown in FIG. 1 is provided with a closure 70 of the type shown in FIG. 9. The container tray 4 has been molded as a unit from a transparent ionomer resin. The cover portion 6 and closure 70 are similarly separately molded from the same material. After filling as will be described below, the cover 6 is heat sealed to tray portion 4. The elongated container body 2 has a length of about 80 millimeters, a width of about 10 millimeters and a thickness of about 3 millimeters. The cuvettes 40, 42 each have a diameter of about 6 millimeters and a depth of about 2 millimeters. A lead mixing sphere coated with a fine film of silicone rubber and having an overall diameter of about 1.2 millimeters is positioned in reception chamber 20 and in cuvettes 40, 42. The separation chamber 26 is provided with glass wool filter material and has an average porosity of about 5 microns. The container is positioned vertically with the lower end 12 down. A blood specimen of 10 microliters is received in closure recess 80 and is introduced into reception chamber 20 which contains 250 microliters of pH 7.0 0.15 tris-phosphate buffer. The blood specimen and buffer solution are mixed by mechanical agitation with the assistance of the lead sphere. Vent cover 54 is removed and piercing point 76 is employed to split membrane 30 to permit the test fluid mixture to enter separation chamber 26. The filter retains the blood cells, while the solution containing glucose is permitted to flow through conduit 44 to cuvette 40, which is the blank cuvette, and then to test cuvette 42. The blank curvette 40 will contain a concentrated syrup composed of 10 units horseradish, peroxidase, 2 micrograms of a chromogen, such as o-tolidine; HCl, 20 micrograms of a polyethylene glycol suspending agent, such as Carbowax 20 M (sold by Union Carbide) and 10 micrograms of a secondary alkylaryl sulfonate at a pH of about 5.2, all in a volume of about 10 microliters. The test cuvette 42 will have the same materials in the same volume as the blanket cuvette 40 and in addition will have 7 units glucose oxidase (low catalase and saccharidase) which facilitates the glucose oxidase conversion of glucose in the test cuvette 42 to gluconolactone and $H_2O_2$ in the presence of oxygen. The blank cuvette 40 serves to compensate for nonspecific light absorbing materials present in the test solution. After the cuvettes are filled, they are shaken for a few seconds to thoroughly mix and dissolve the reagents. Colorimeter light beams are then passed through body cuvettes 40, 42 at a wavelength of 630 nm. and a reading of glucose concentration in test cuvette 42 is obtained in two to ten minutes on the basis of the light energy absorbed by the specimen in test cuvette 42, with compensation being effected through blank cuvette 40. The colorimeter should be standardized according to accepted laboratory procedures.

A distinct advantage of the present invention as applied to blood glucose testing is that it permits a diabetic to make home use or doctors to make office use of blood as a source of glucose concentration rather than urine which is the conventional approach in most nonclinical environments. As blood provides a more reliable indication of glucose than does urine, this is yet another advantage of this invention.

EXAMPLE 2

As another example of the sort of test which may be performed by means of the test containers of this invention, a typical enzyme test, i.e., the serum glutamate-oxalacetate transaminase assay (SGOT), will be considered in connection with the structure of FIG. 1. A container tray 4 is composed of molded polystyrene and has a cover 6 of the same material ultrasonically sealed to it to complete the package, after providing desired chemical materials. The reception chamber 20 contains 150 microliters of 0.1 M phosphate buffer and 0.33 M in L-aspartate with a sealing closure in position to retain the material in the reception chamber 20. In initiating the test, use may be made of a 1 millimeter diameter glass fiber cord about 20 millimeters in length, which has been provided with two solutions, frozen and lyophilized, at opposed ends. The cord contains dried 15 micrograms of reduced nicotine adenine dinucleotide at one end and 5 units purified malate dehydrogenase at the other end. The cord is introduced into reception chamber 20 through opening 22. A 10 microliter specimen of blood serum is added and closure 70 is placed in opening 22. The container is shaken to thoroughly mix the contents. After thorough mixing, the container is left to stand at 37° C. for about 15 minutes for endogenous spontaneous NADH oxidation to occur. At this time, frangible membrane 30 is broken by finger pressure or the closure point 76. The liquid is permitted to flow through separation chamber 26 into fluid conduit 44 and then to first or blank cuvette 40 and subsequently through conduit 46 into second or test cuvette 42 which contains 0.14 milligram sodium alpha-ketoglutarate. The liquid continues to flow until it stops by self-leveling. The device is shaken for a few seconds until the test cuvette 42 contents are homogeneous. The container is then placed into a heater colorimeter well of a thermostated colorimeter which has been warmed to 30–39° C. and the wavelength set at 340 nm. The reaction rate is then determined. The unit activities may then be calculated in the standard manner taking into consideration the light absorption path for reaction as established by the cuvette thickness and the temperature factors.

Referring now to FIGS. 16 and 17, another embodiment of the invention will be considered. In the form of the invention shown in these figures several advantageous modifications have been provided. The elongated container 90 has a reception chamber which is divided into two compartments 92, 94 by means of integrally molded divider wall 96. As a result, different reagent materials may be stored out of contact with each other. For example, a liquid reagent may be stored in compartment 92 and a dry reagent material might be stored in compartment 94. This facilitates prolonged shelf life for the container assembly as frequently reagent materials may be stored for a longer period if separated than would be the case were they premixed. Also, this structure facilitates mixing the specimen first with one reagent material and then with another. If desired, one or more additional integrally molded divider walls may be provided in order to establish more compartments within the reception chamber.

It is noted that the passageway 98 is closed by means of an integrally molded membrane 100 which must be fractured in order to gain access to reagent compartment 92. Membrane 100 as well as membrane 102 which separates compartment 94 from separation chamber 110 may both be fractured by any suitable means such as closure element 70 which has piercing means 76.

Another feature of this embodiment of the invention is that cuvettes 112, 114 are provided with integrally formed recesses 116, 118 which are adapted to receive all or part of mixing means 120, 122. This facilitates storage of the mixing means in a noninterfering position with respect to the reagent materials provided in the cuvettes 112, 114 and fluid conduits 130, 132 as well as exhaust vent 134. Also, when a reading of the test results is to be obtained by means of an instrument such as a colorimeter, the recesses 116, 118 retain the mixing means in noninterfering relationship with respect to the light beam.

In this form of the invention, the exhaust vent 134 terminates in an opening 136 which is closed by a removable closure element 138 which may conveniently be a resilient stopper or a strippable film. Another aspect of venting and fluid flow as preferably effected in the structure of this invention is shown in FIG. 16. Considering cuvette 112 as having a clock face, it is noted that liquid entering cuvette 112 will enter at approximately an eleven o'clock position and liquid exiting cuvette 112 will exit at approximately a twelve o'clock position. This facilitates smooth efficient flow and provides minimal carryover of chemical materials originally in cuvette 112 into cuvette 114. It is also noted that liquid conduit 132 enters cuvette 114 at approximately the one o'clock position and vent 134 emerges from approximately a twelve o'clock position. This facilitates efficient liquid flow into cuvette 114. It will, therefore, generally be preferred to have exhaust conduits, be they vents or liquid conduits, connected to cuvettes at about the twelve o'clock position and have entry conduits enter closely adjacent such exhaust conduits.

While in FIG. 16, as in prior figures, in specific exemplary references the separation chamber has been described as being a filtration chamber, such as chamber 110, the invention is not confined to such a specific form of separation chamber. For example, anion exchange bed, a catalyst bed, a chemical adsorbent bed or a liquid extraction (partition) chamber could be employed.

EXAMPLE 3

An example of a test for urea employing the test container of FIG. 16 will now be considered. The membrane 100 is fractured and a 2 microliter specimen of blood serum or plasma is introduced into reception chamber compartment 92 which contains a solution of 0.1 M "tris"-acetate buffer, pH 8.5 and 30 micrograms of sodium alpha-ketoglutarate. The solution and specimen are subjected to mechanical mixing to allow the urea to be uniformly distributed. Membrane 96 is then opened to permit the test fluid to enter reception chamber compartment 94. This compartment 94 contains a piece of glass filter paper having 0.4 unit of L-glutamic dehydrogenase absorbed in one portion and 50 micrograms of reduced nicotine adenine dinucleotide (NADH) absorbed in another portion. The specimen and materials in compartment 94 are mixed thoroughly and allowed to stand for five minutes. Membrane 102 is then fractured to permit the test liquid to enter filtration chamber 110. Vent closure 138 is then removed to facilitate downward flow. The filtered test liquid then enters blank cuvette 112 and subsequently enters test cuvette 114. Blank cuvette 112 contains reagent materials. The test cuvette 114 contains 0.01 unit of high purity, $NH_3$ free urease. The test container is agitated to effect mixture of the materials in test cuvette 114. The urease serves to liberate $NH_3$ from the urea while the blank cuvette 112 serves to compensate for nonspecific endogenous conversions of NADH to NAD. Using a colorimeter, the absorbance, which is measured at a wavelength of 340 nm., is found to be proportional to the cencentration of urea in the serum or plasma specimen.

Referring now to FIG. 18, another embodiment of the invention will be considered. In this form of the invention the reception chamber 150 is connected with the container exterior by means of a passageway 152 which is sealed by closure 154, which is preferably a resilient closure element. Closure 154 may be removed or penetrated by a syringe in introducing a specimen into reception chamber 150. Passageway 160 which connects reception chamber 150 with separation chamber 158 is closed by a seal 156 which may take the form of a displaceable resilient sealing element such as a rubber or plastic element or one composed of a material such as grease, petroleum jelly or silicone. In employing this form of the invention, the seal 156 may be unseated by means which physically contact the same such as by a rod or a closure element 70 or the container may be attached to a source of air pressure or vacuum which causes the seal 156 to be displaced from passageway 160. It will be appreciated that, if desired, in both this embodiment and other embodiments air pressure or vacuum means may be employed to establish a fluid flow rate above that which would normally be provided through reliance upon gravity flow. In those instances where vacuum is employed, the vacuum means would preferably be attached to an exhaust vent opening.

Considering now another feature of the invention as illustrated in FIG. 18, it is noted that first cuvette 170 and second cuvette 172 are provided with independent conduit means which establish parallel flow from the separation chamber 158 to the cuvettes 170, 172. This is contrasted with the sequential flow arrangement shown in FIGS. 1 and 16. In this form a passageway 174 connects the separation chamber 158 with the first cuvette 170 and a second passageway 176 connects the second cuvette 172 with the separation chamber 158. Cuvette 170 is provided with an exhaust vent 178 which communicates with the container exterior and is covered by a gas permeable, liquid impermeable tape or film closure (not shown). This closure need not be removed during container use as it will permit gas exhaust, but will resist liquid discharge. Among the materials suitable for use in closure is a woven polyolefin such as that sold by DuPont under the trade designation "Tyrek." It is noted that the vent opening 182 in vent 178 communicates with the container exterior at a level higher than first cuvette 170. Similarly, second cuvette 172 has an exhaust vent 184 which has an opening 186 and is covered by a gas permeable, liquid impermeable film or tape closure (not shown). Each cuvette 170, 172 has been provided with mixing means 190 in order to facilitate efficient mixing within the respective cuvettes 170, 172.

Referring now to FIGS. 19 through 21, another embodiment of the invention will be considered. In this form of the invention the elongated container 200 has a primary closure 202 and a secondary closure 204. Closure 204 is preferably composed of a resiliently compressible material and extends into the interior of container body 200 through an opening 206 in the side wall 208 of the container. An internal integrally molded divider wall 210 extends transversely across the container body 200 and cooperates with the secondary closure 204 to separate the reception chamber 216 from the filtration chamber 218. When it is desired to permit flow of the test fluid from reception chamber 216 into separation chamber 218 one need merely displace secondary closure 204. In the form shown inner portion of secondary closure 204 is enlarged to resist complete separation from the container. This serves to reduce the likelihood of contamination of the user by potentially hazardous materials contained in the specimen or the chemical materials.

Another feature of the embodiment shown in FIGS. 19 through 21 is that the tray portion 220 has relatively thin walls which may, if desired, approximate the thickness of film 222, but will generally be slightly thicker than the film 222. As is shown in FIG. 21, the first cuvette 230 is defined by a pair of upstanding walls 232, 234 in lieu of the form shown in FIGS. 7 and 8 wherein the cuvettes 40, 42 are provided by establishing recesses in the otherwise solid cross sectional profile of the tray. Similarly, exhaust vent passageway 240 is defined between exterior wall 242 and an interior divider wall 244. It is noted that the void 246 between walls 232 and 244 results in a savings in material as in the embodiment of FIGS. 7 and 8 this portion would have been of solid section. Fluid conduit 248 is defined by divider wall 250 and exterior wall 256. A void 254 is defined between divider wall 250 and wall 256. This also results in a savings in material.

Considering now FIG. 19a, another form of seal between reception chamber 260 and a filtration chamber 262 will be considered. In this form of the invention, a seal element 264, which may be composed of a resilient gasket material, is positioned transversely between side walls 270, 272 and is provided with support from stub wall 276. After processing of the specimen within the reception chamber, a force applied to the seal element 264 in the direction indicated by the arrow will result in its being displaced to a position 264' indicated by the dotted line. The second stub wall 280 prevents entry of the seal element 264 into the interior of filtration chamber 262. The force applied to move the seal element 264 may conveniently be either a direct mechanical contacting force such as by closure element 70 or a noncontacting force such as by air pressure or vacuum. An alternate approach would be to provide a seal element similar to element 264 without the presence of stub walls 276, 280 but with a container transverse groove (not shown) receiving the lower edge of the element which will be rotated about a horizontal axis in a downwardly direction toward the lower end of the container when subjected to a force in the direction shown in FIG. 19a to permit fluid flow therebeyond.

Referring now to FIG. 22, a modified form of container of this invention will be considered. The reception chamber 30 has a frangible ampule which in the form shown is a plastic envelope 306. Envelope 306 may contain suitable reagent materials for admixture with the specimen and/or suitable specimen diluting materials, such as isotonic saline solution. Integrally formed frangible membrane 302 separates the reception chamber 300 from the container exterior. A second integrally formed membrane 304 is disposed in supporting relationship with respect to plastic bag 306. If desired, a second specimen mixing material may be disposed within the reception chamber 300 exteriorly of the plastic bag 306 in order to provide for desired separate storage which facilitates prolonged shelf life.

In initiating operation of the container system of FIG. 22, it is preferred that a closure 290 be provided with a vent opening 292 and a pair of different sized liquid receiving recesses 294, 296, each of which are adapted to receive a predetermined quantity of whole blood, blood serum, blood plasma or other liquid specimens. After one of the recesses has been filled with the desired specimen, the closure 290 is moved downwardly in order to fracture membrane 302 by means of point 298. Continued downward movement of the closure 290 causes point 298 to pierce plastic envelope 306 and move the specimen containing groove 294, 296 into reception chamber 300. Any excess blood will be wiped from the closure 290 by the opening defining wall of the container as the closure shank passes through the opening. The container, with the closure 290 in a position to close the opening to the container exterior, is then shaken in order to mix the specimen with the reception chamber contents.

The closure is then moved downwardly farther in order to cause point 298 to pierce frangible membrane 304 and permit the test fluid to flow into filtration chamber 312 which will contain a suitable filter material such as glass wool. It is noted that the lower surfaces 308, 310 of the reception chamber 300 slope downwardly toward the filtration chamber 312 in order to facilitate flow into chamber 312. The filtered test fluid will exit from the lower portion of the filtration chamber 312 and simultaneously enter blank chamber 316 and reaction chamber 314. These chambers 314, 316 are provided with mixing means 326, which may also be provided in reception chamber 300, if desired. Blank chamber 316 has exhaust vent 318 which has opening 320 in communication with the container exterior. Similarly, reaction chamber 314 is provided with vent 322 and vent opening 324. If desired, gas impermeable tape covers may be provided over openings 320, 324 in order to facilitate flow control by removal of the tapes serving to initiate flow into chambers 316, 314, respectively.

Test fluid emerging from blank chamber 326 will flow through fluid conduit 332 to cuvette 328. It is noted that fluid conduit 332 has a chemical material storage sector or depot 334 which may contain a desired mixing material such as a pH altering substance. Test fluid passing through conduit 332 will automatically be mixed with the contents of depot 334. Similarly, test fluid exiting reaction chamber 314 will flow through fluid conduit 336 to cuvette 330 and will pass through depot 338 en route. It is noted that the form of depot arrangement illustrated in FIG. 22 is a preferred form as test fluid enters the depot generally in the lower regions of the depot and exits therefrom generally in the higher regions of the depot. This arrangement serves to minimize the formation of air bubbles and provide for smoother flow of the test fluid therethrough.

It is noted that the cuvettes each contain mixing means 326 which will facilitate admixture of the chemical materials contained therein with the test fluid. Cuvette 328 is provided with an exhaust vent 340 which has opening 342 disposed at an elevation higher than the bottom of blank chamber 316. Also, cuvette 330 has an exhaust vent 344 which has an opening 346. If it is desired to control or delay flow into the cuvettes 328, 330, gas impermeable tapes or covers may be removably secured to the openings 342, 346. Also, fine porosity gas permeable tapes may be placed over openings 342, 346 in order to control the flow rate. Any gas impermeable tapes employed to initiate flow would be positioned over such gas permeable tapes.

EXAMPLE 4

The embodiment of FIG. 22 will now be considered in an example of stepwise addition and control of reaction sequences using the preferred Gochman method for the determination of uric acid. Blood from a suitable source, such as an earlobe puncture, is added to the 20 microliter volume blood groove 294 of closure 290. The closure is pushed down to rupture membrane 302 and is moved into reception chamber 300 where it penetrates plastic bag 306 which contains 300 microliters of isotonic NaCl and 200 micrograms of a suitable surfactant. (The surfactant may be positioned within the reception chamber 300 exteriorly of the bag 306.) The contents are thoroughly mixed. The point 298 of closure 290 proceeds to penetrate frangible membrane 304 which permits the fluid to flow along sloped surfaces 308, 310. The blood cells are retained by the fine mesh filter and the test fluid fills reaction chambers 314, 316. Blank reaction chamber 316 is devoid of uricase, but does contain buffer (2 mg. $Na_2B_4O_7 \cdot 10H_2O$). The test reaction chamber 314 contains 0.005 unit uricase (*Candida utilis*, Type IV, V–8500). The container is shaken vigorously and then incubated at 37° C. for 5 minutes. Next, covers over vent openings 342, 346 are removed. The test fluid then proceeds through conduits 332, 336 into depot reservoirs 334, 338 which each contain 0.4 microgram dried MBTH (3-methyl-2-benzothiazolinone hydrazone·HCl) and 12 micrograms dimethyl aniline chloride hydrochloride incorporated into a granule of 1.0 mg. containing sufficient citric acid to bring the pH to 4.3 in the cuvettes 328, 330 when filled and agitated to mix thoroughly. The cuvettes 328, 330, which contain 0.002 purpurogallin unit of Type VI, P–8375 horseradish or the equivalent, are incubated for at least 5 minutes and read at 600 nm. in a spectrometer or colorimeter which has been previously calibrated with a series of determinations with the structures introducing a series of serums or aqueous standards containing varying known amounts of added uric acid.

FIGS. 23 and 24 show yet another embodiment of the invention. In this form, the container 350 has a reception chamber 352 which is defined in part by solid exterior walls 354, 356, 358. Access to the interior of the reception chamber 352 in order to insert a specimen is obtained by grasping pull tab 360 of cover 362 and stripping back the cover to permit access. The bond between the cover 362 and the remainder of the container is preferably established by means of a pressure sensitive adhesive in order that the cover 362 may be restored to sealed position after insertion of the specimen has been completed. This restoration facilitates mixing of the specimen with any chemical materials packed in the reception chamber 352 or introduced when the specimen is introduced.

Referring now to FIGS. 25 and 26, another advantageous feature of the present invention will be considered. In this form cuvettes 370, 372 are provided with exhaust vents 374, 376, respectively, which have been provided with strippable gas and liquid impermeable tape closures 382, 384 which overlie permanently secured opening covers 378, 380, respectively. Opening covers 378, 380 are composed of a gas permeable, liquid impermeable material. In addition, liquid conduit 390 connects cuvette 370 with separation chamber 392 and liquid conduit 394 connects cuvette 372 with separation chamber 392. Conduit 390 is provided with a reagent depot reservoir 396 and conduit 394 is provided with reagent depot reservoir 398 which may conveniently contain desired additional materials, such as buffering agents. The materials may conveniently be provided in dry powder or tablet form. The test liquid in passing through conduits 390, 394 will be mixed with reagent materials contained within reagent depots 396, 398, respectively.

In another embodiment of the invention, which is shown in FIG. 27, the simultaneous treatment of a standard speciment and a test specimen is facilitated by the multiple container construction which employs a single structure housing two modular test systems. In this form the container body 400 is provided with duplicate structual systems wtih each system being separated from the other. Thus, reception chamber 402 is separated from reception chamber 404 by divider wall 406. It is noted in this embodiment that in lieu of placing primary reliance upon the closure shanks 408, 410 to effect the seal in the container end wall, integrally formed frangible membranes 412, 414 serve as the seal means separating the reception chambers 402, 404, respectively, from the container exterior. It will be appreciated that reagent materials may be stored above membranes 412, 414, if desired. During storage prior to use, a separate closure member such as a strippable tape or film or individual stoppers, for example, may be employed in lieu of a closure such as closure 480 to close the container interior from contact with the exterior.

Interior membranes 416, 418 separate reception chambers 402, 404 from separation chambers 430, 432, respectively. Fluid emerging from separation chamber 432 will pass to first cuvette 434 through conduit 436 which has depot reservoir 438 and then through conduit 452 which has depot reservoir 454 to cuvette 450. A similar structure is contained in the parallel system which has cuvettes 460, 462. As is shown in FIGS. 27 and 28, in this embodiment of the invention cuvettes 450, 462 are provided with exhaust vent passageways 464, 466, respectively, which communicate through a vent chamber 474 with a vent opening 470 in cover 472. In a preferred form, the vent opening 470 will be covered with a gas permeable, liquid impermeable membrane 476 which may be retained in position during processing. If it is desired to obtain more precise control over the initiation of flow, a removable gas impermeable tape (not shown) may be secured over the membrane 476.

It is also noted that in FIG. 27 a single closure element 480 is adapted to be operated substantially simultaneously in processing both chambers. The depending shanks 482, 484 are each provided wtih vent recesses 486, 488 and specimen receiving recesses 490, 492.

If desired, the analytical test container of this invention may be protectively packaged individually or in groups in a suitable outer package which will preserve the desired degree of cleanliness. A plastic coated heat sealed foil pouch, for example, might be employed for such purposes. The reference herein to the seal "between" the reception chamber and the container exterior shall include the use of such exterior pouches or envelopes which function to resist undesired contact between the container interior and the atmosphere of the external environment. It will generally be preferred, however, to provide an independent closure element such as closures 70, 100, 202, 290, 362, 412, 414 or a strippable tape in addition to or in lieu of the outer package form of seal.

EXAMPLE 5

An example of how the multiple container system of FIG. 27 might be employed in simultaneously running a test and a standard reaction on blood serum in order to test for lactate dehydrogenase (LDH) will now be considered. In FIG. 27, the left hand subsystem will serve as the test system and the right hand subsystem will serve as the standard subsystem. The standard subsystem permits reconstituted elevated enzyme control serum standardized in Wrobleski LDH units to provide the units directly for calculation of the patient's LDH level. Blank cuvettes 434, 460 are provided in order to compensate for the enzyme's nonspecific oxidation (endogenous) of NADH. The container body 400 is composed of clear polypropylene and has 25 micrograms of dry NADH within each upper compartment defined above membranes 412, 414. Compartments 402, 404 of the reception chamber each have 300 microliters of pH 7.4 0.1 M phosphate buffer. The specimen receiving recess 492 of closure 480 is filled with 10 microliters of blood serum and recess 490 is filled with a high quality reconstituted control serum. Closure 480 is moved downwardly to fracture membranes 412, 414 and dissolve the NADH in the buffer solution. Continued downward movement introduces the test serum and control serum into the NADH buffer solutions. The container is agitated to mix the contents. Continued downward movement of the closure 480 results in fracture of membranes 416, 418 which permits the two respective liquids to flow simultaneously through filtration chambers 430, 432 and into cuvettes 460, 434, respectively, and filling the same. The liquids then flow into cuvettes 462, 450, respectively. Cuvettes 462, 450 occupy a volume of 58 microliters and possess 2 mm. inside thickness. Mixing means in the form of acrylic film coated lead spheres are provided in the cuvettes 462, 450. Each of the cuvettes 462, 450 contains 15 micrograms sodium pyruvate. The containers are shaken to dissolve the sodium pyruvate substrate and a reading is made at 340 nm. every fifteen seconds in a colorimeter with the test and standard sides being alternated every five minutes. Comparison of the two slopes at linear segments permits the simple calculation of the patient's LDH activity in Wrobleski units. Alternatively, if the instruments possess a rate read out circuit, the enzyme units may be obtained directly from the respective readings. The rate value of the test divided by the rate value of the standard and multiplied by concentration in the standard multiplied provides the patient's test LDH activity in the Wrobleski units.

Figure 29:
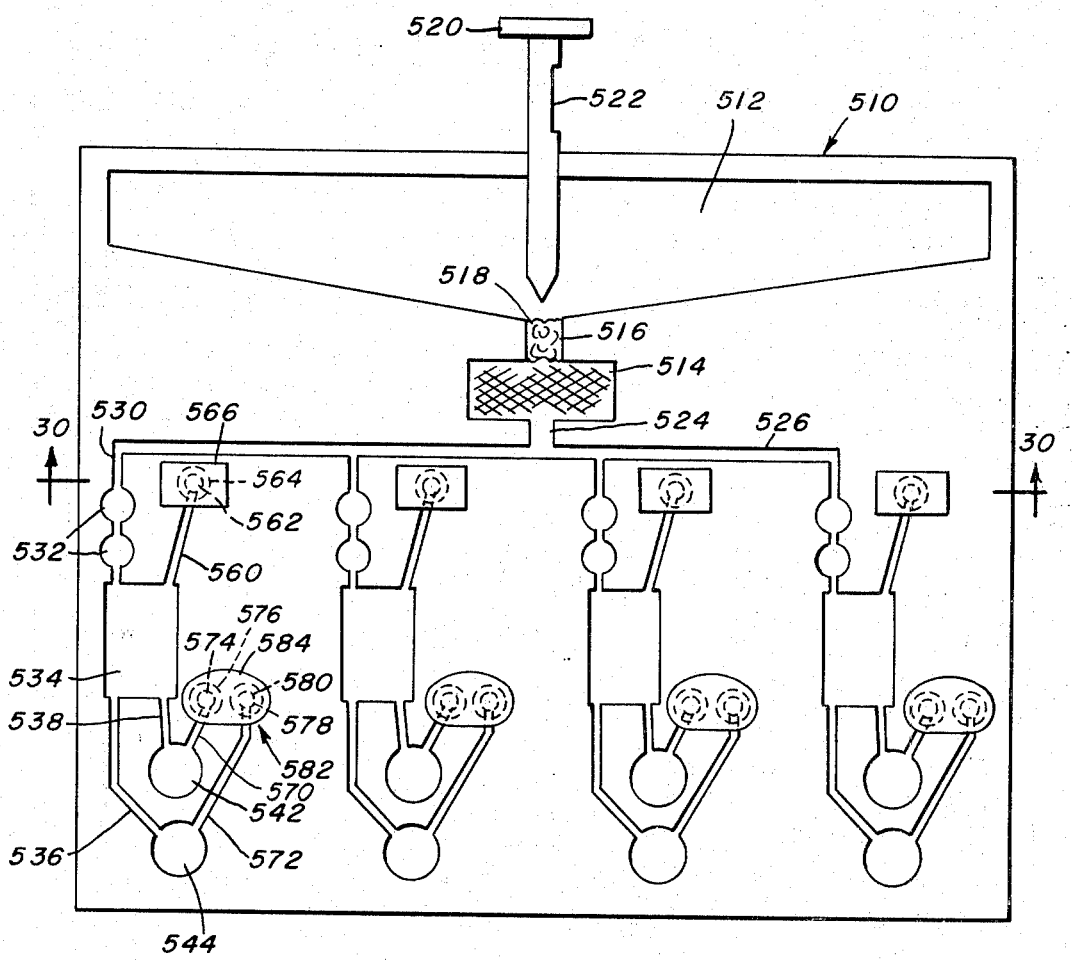
FIG. 29 shows yet another modified embodiment of the invention in front elevational view with a multiple width container having a number of processing structures being provided.
Figure 30:
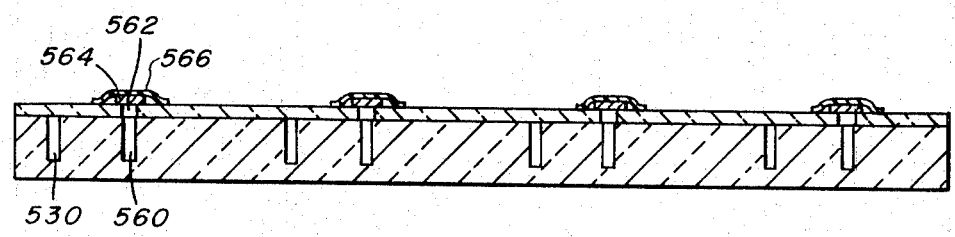
FIG. 30 is a cross sectional view taken through 30—30 of FIG. 29 showing the venting arrangement of FIG. 29.

One advantageous embodiment of the analytical test container of this invention is illustrated in FIGS. 29 and 30. The multiple container assembly 510 employs four modular identical subsystems, although different numbers of subsystems may be employed if desired. The assembly 510 has a reception chamber 512 in communication with a separation chamber 514 through a passageway 516 which has a destructible or displaceable sealing element 518 which in this instance is a petroleum jelly seal. Specimen introduction and seal removal is effected by means of closure 520, which has vent channel 522, in a similar fashion to that described above in connection with closure 70. In this form of the invention a number of identical subsystems which are adapted to independently process the specimen are provided to facilitate multiple testing of the specimen. Fluid emerging from filtration chamber 514 passes through conduit 524 to distributor header conduit 526. For simplicity of description, each of the systems have been shown as being substantially identical and reference numerals will be employed on only one such subsystem. Considering the numbered subsystem, a fluid conduit 530 connects with header conduit 526 and passes through reagent depot reservoirs 532 and into processing chamber 534. Conduit 536 supplies the test liquid to be treated to cuvettes 544 and the conduit 538 supplies the test fluid to cuvette 542.

As is shown in FIGS. 29 and 30, processing chamber 534 has a vent line 560 which is connected with vent opening 562. In order to resist undesired discharge of liquid through vent opening 562, it is covered with a gas permeable, liquid impermeable film 564, such as a microporous polyolefin sheet (DuPont "Tyrek") or a microporous polypropylene sheet (Celanese "Celgard"). The latter material may serve to retard the rate of exhaust and thereby permit added flow rate control. Overlying film 564 is a gas and liquid impermeable tape 566 which may function as a flow initiating element whose removal permits exhaust of gas and air from processing chamber 534 and permits flow into the chamber 534. In the form shown each system is provided with separate strippable tapes 566 in order to permit individual control of each subsystem. If desired a single tape strip adapted to be removed as a unit may be employed in lieu of the separate tape elements 566. Similarly, cuvettes 542, 544 have vent exhaust conduits 570, 572, respectively. Conduit 570 communicates with vent opening 574 and conduit 572 communicates with vent opening 578. Cover elements 576, 580 are composed of a gas permeable, liquid impermeable film to permit automatic venting. In addition, strippable vent cover 584 in the form of a plastic film may be provided. Sequential removal of the vent covers 584, which may be provided as a single cover for all subsystems, if desired, can be employed to provide a time delay factor in the operation of each of the subsystems.

The multiple unit containers of FIGS. 29 and 30 are particularly useful in establishing special profiles such as those employed in cardiac emergency diagnosis of coronary thrombosis by such commonly used tests as serum glutamate-oxalacetate (SGOT), lactate dehydrogenase (LDH), creatine phosphokinase (CPK) and hydroxy hityrate dehydrogenase (HBDH). The system may also be advantageously employed with a physicians office examination to provide a convenient blood profile including glucose, urea, uric acid and triglycerides.

While for convenience of illustration multiple systems, such as those shown in FIGS. 27 and 29, have had the systems disposed in side by side adjacency, it will be appreciated that should it be desired the systems may be positioned in superposed vertically stacked relationship with respect to each oher, preferably with communication therebetween, in lieu of or in addition to the horizontal side by side relative positioning shown in FIGS. 27 and 29. If desired, the cover of one section may serve as the tray or base of the overlying one.

FIGS. 31 and 32 illustrate yet another embodiment of the invention. In this form of the invention, the container body 600 has pair of elongated reception chambers one of which is adapted to serve as a blank and the other as a test chamber. Reception chamber 602 has an outer closure 606 and an inner closure 608 secured to each other by connector 610 in order to facilitate withdrawal of inner closure 608 responsive to withdrawal of outer closure 606. Reception chamber 604 has an outer closure 612 and an inner closure 614 with a connector 616. In order to permit initial processing, a specimen is introduced into the chambers 602, 604 by removing the closures 606 and 612 but not to such an extent to withdraw inner closures 608, 614. The closures 606, 612 are then repositioned in sealing relationship and the specimens are mixed with the desired reagent by mechanical agitation of the container. After mixing, closures 606, 612 are completely withdrawn and closures 608, 614 are also removed as a result of connector sections 610, 616. The fluids are then permitted to flow downwardly through conduits 620, 622 into cuvettes 624, 626. (Cuvette 632 has been shown to present an optional method of providing an extra blank or reagent reservoir, should one be needed.) In use as a sealed standard or blank, the conduit between cuvette 632 and cuvette 626 may be eliminated.

It is noted that the cuvettes 624, 626 are vented to a level higher than the bottoms of reception chambers 602, 604 and that gas permeable covers are not shown, but they may be provided, if desired. Also, strippable vent covers may be provided to resist entry of foreign matter into the vents during container storage.

EXAMPLE 6

An exemplary use of the system shown in FIG. 31 in a cholesterol test will now be considered. The container 600 is molded from poly methylpentene which has the desired heat resistance characteristic and chemical inertness, as well as transparency. Both reception chambers 602, 604 are provided with 100 microliters of a reagent solution of 0.05 M ammonium 2,5-dimethylbenzene sulfonate and 6.33 M acetic anhydride in glacial acetic acid. Into reception chamber 604, which will be used as the standard chamber, 2.5 microliters of a sample of glacial acetic acid having a concentration of 200 milligrams of cholesterol per hundred milliliters is introduced. Into blank reception chamber 602 a quantity of 2.5 microliters of water is introduced. In order to increase reliability of the test a second container 600' is employed. The second container will be identical in structure as the first with reference numerals being the same except for the presence of a "prime" symbol after reference numerals of the second container. In the test reception chamber 602', 2.5 microliters of blood serum is introduced into 100 microliters of a reagent solution of 0.05 M ammonium 2,5-dimethylbenzene sulfonate and 6.33 M acetic anhydride in glacial acetic acid. Blank reception chamber 604' will have 2.5 microliters of water in 100 microliters of the same reagent solution. The chambers 602, 602', 604, 604' are closed and shaken vigorously until homogeneity is observed in all solutions. Closures 606, 606', 612, 612' are then removed with closures 608, 608', 614, 614' also being removed as a result of connections 610, 610', 616, 616'. Vent covers (not shown) are composed of polymethylpentene film which is heat sealed in position. The covers are either removed or loosened to permit venting. The fluid in chambers 602, 602' then flows through conduits 620, 620' into test blanks cuvettes 624, 624' and the fluid in chambers 604, 604' flows through conduits 622, 622' into cuvettes 626, 626'. Cuvettes 624, 624', 626, 626' contain 25 microliters of 96% $H_2SO_4$ which when mixed with the inflowing liquids serves to cause the Lieberman-Burchard reaction to occur. The standard run in the first container is run simultaneously with the test run in the second container in order to improve reliability. After mixing, the containers are left to stand for fifteen minutes at room temperature. The containers are each independently read in a colorimeter at a wavelength of about 570 nm. The cholesterol concentration at the test specimen in milligrams per 100 milliliters of serum is obtained by dividing the absorbence of the standard into the absorbence of the test specimen multiplied by 200.

The container 630 shown in FIGS. 33 and 34 provides a means of performing tests involving the use of selectively operative materials such as solid catalysts (including immobilized enzymes, ion exchange celluloses, selectively permeable gels, molecular sieves and porous glass, for example). The container 630 is provided with a reception chamber 632 which is subdivided by frangible membranes 634, 636, which are adapted to be fractured as by point 640 of closure shank 638. After fracture of membrane 634 and introduction of the specimen, such as whole blood, blood serum, plasma or urine, mixing may be effected prior to fracture of membrane 636. The test liquid may then flow along sloping reception chamber surface 652, through conduit 642 and under the influence of the hydrostatic head through filtration chamber 644. Test liquid emerging from filtration chamber 644 will flow through conduit 646 and into ion exchange chamber 648 which contains an ion exchange bed which effects ion conversion in the liquid. The liquid then proceeds through conduit 650 into run-off trap 660 which will initially fill and permit subsequently arriving liquid to flow directly into conduit 662. This run-off trap 660 serves to remove any undesired partially decomposed material which might be present in the liquid such as material decomposed during storage of the container. Liquid flowing in conduit 662 will be divided into two streams which flows in conduits 666, 668. Conduit 668 flows to chamber 670 which may contain an immobilized enzyme which may be on porous glass or cellulose, for example, which has been separately prepared and introduced into chamber 670 during container manufacture. Test liquid will interact with the immobilized enzyme and then proceed through conduit 680 to cuvette 692 which may contain further test chemicals for mixing with the test liquid in the cuvette 692 with the aid of mixing cylinder 696. Cuvette 692 has an exhaust vent 704 which communicates with the container exterior at vent opening 706.

Liquid flowing through conduit 666 will enter blank chamber 672 which will contain the porous glass or cellulose, but no immobilized enzymes. The liquid will then proceed through conduit 682 into cuvette 690 which has mixing cylinder 694. Cuvette 690 has an exhaust vent 700 which terminates at vent opening 702.

Referring now to FIG. 34 there is shown a section of container 630 illustrating conduits 642, 646, 650 as well as portions of the filtration chamber 644 and the ion exchange bed 648. The filtration chamber is provided with a suitable filter material of the desired mesh porosity. A suitable ion exchange resin in a strong acid-strong base form is provided in bed 648.

EXAMPLE 7

An example of how the container of FIG. 33 may be employed in the determination of blood urea nitrogen will now be considered. A 0.5 microliter whole blood specimen is introduced into the reception chamber 632, which contains 250 microliters 0.9% NaCl solution, by fracturing membrane 634 with closure point 640. The container is shaken until the blood is uniformly dispersed and diluted. Frangible membrane 636 is then broken. The test liquid then flows into filtration chamber 644 which contains a fine mesh, unsized glass filter. The stream proceeds into conduit 646 with the blood cells remaining in the filter. The stream of test liquid then enters ion exchange bed 648 (strong acid-strong base mixed resin 100–200 mesh). The liquid continues through this unit and is deionized with the effluent proceeding through conduit 650 into run-off chamber 660 until it is filled, at which time the liquid enters conduits 666, 668 through conduit 662. The liquid enters chambers 670, 672. Chamber 670 contains high activity immobilized urease on 100–200 mesh porous glass. Chamber 672 contains the same 100–200 mesh porous glass but no urease. The liquids continue through conduits 680, 682 into test cuvette 692 and blank cuvette 690, respectively, each of which contains 35 micrograms of cresol red (yellow). The cuvettes 690, 692 each have a diameter of 6.0 mm. and a light path in liquid of about 2.0 mm. The curettes are shaken and it is found that the absorbance of the cresol red anion, which is induced by the ammonia formed in the presence of the immobilized urease, is proportional to the concentration of urea present in the blood. The absorbance may be measured by visual matching against a series of red hues of deepening intensity which read out the urea concentration or a properly calibrated colorimeter which may be employed with a filter of the wavelength of maximum absorption.

EXAMPLE 8

The container of FIG. 33 may readily be employed in a glucose test by repeating the procedure of Example 7 but employing immobilized glucose oxidase in lieu of the immobilized urease and substituting the same quantity of brown cresol purple (purple form) for the cresol red, using the proper yellow absorption filter.

The container of FIG. 35 may be advantageously employed in a number of enzyme assays in addition to other tests. The structure shown is particularly suited for use in an enzyme test employing a whole blood specimen. As a result of the outer closure being a membrane 732 and inner membrane 746, 748 being employed, the reception area has two compartments 736, 738 which may contain separate chemical materials to be admixed with the specimen. If desired an exterior tape or other closure could be employed in lieu of membrane 732. The outer membrane 732 may be fractured by piercing element 734 and the specimen may then be introduced for admixture with the chemical materials contained within compartment 738. Subsequently, membrane 746 may be fractured by piercing element 734 or manual compressive force to permit introduction of the test specimen and admixture with the chemical materials contained within compartment 738. Alternatively, both membranes 732, 746 may be fractured substantially simultaneously and the specimen mixed for the first time in compartment 738. After mixing has been completed in compartment 738, membrane 748 may be fractured to permit flow of the test specimen into filtration chamber 760 which contains a suitable filter material. It is noted that flow into the filtration chamber 760 will be facilitated as a result of the downwardly sloping lower surfaces 750, 752. The filtered material will enter staging chamber 762 which has vent 764 provided with vent opening 766. In the form shown the vent opening 766 is covered. In the event that the container is not prepacked in a protective outer package, such as a coated aluminum foil envelope, for example, it may be particularly desirable to cover vent opening 766 with a strippable tape to resist entry of foreign material into the vent 764 prior to use.

Fluid emerging from the staging chamber 762 will enter blank reaction chamber 786 and also will enter test reaction chamber 784. It is noted that blank reaction chamber 786 has vent 800 terminating in vent opening 804 which is covered with gas impermeable tape 804. Similarly, reaction chamber 784 has vent 790 provided with vent opening 792 covered by gas impermeable tape 796. Fluid flow into chambers 784, 786 will be initiated when vent covers 796, 804 are removed. The container is then shaken to start the reaction between the test specimen and the chemical materials in the reaction chambers 784, 786. Blank cuvette 812 and test cuvette 810 are provided with chemical materials which will stop the enzyme reaction initiated in the reaction chambers. As the test being described is a timed enzyme test, after the predetermined time has elapsed and it is desired to stop the reaction, vent covers 834, 840 may be removed to permit exhaust of air through vent opening 832 of vent 830 and through vent opening 838 of vent 836 in order to permit flow from blank reaction chamber 786 through conduit 820 into cuvette 812 and also to permit flow from test reaction chamber 784 through conduit 822 to cuvette 810. Chambers 784, 786 will contain volumes of test fluid sufficient to fill cuvettes 810, 812, respectively. Color comparison, either visual or by means of a suitable instrument, of the test and blank cuvettes 810, 812 with an appropriate standard will provide an index of enzyme concentration. As is preferred with all enzyme reaction tests, the specified temperatures for the particular tests should be maintained.

While for purposes of illustration vents 790, 800 have been shown as having independent cover tapes 796, 804, it will frequently be more convenient to provide a single tape which uncovers both vent openings 792, 802 with a single action. Similarly, a single tape may be employed to take the place of separate covers 834, 840.

If it is desired to employ the apparatus of FIG. 35 for enzyme rate analyses, the test fluid may be permitted to pass directly from the staging chamber 762 directly to the cuvettes 810, 812. In such a test, the cuvettes will be provided with chemical materials which will permit the reactions to occur in the cuvettes 810, 812. In the event that the test specimen is blood serum or blood plasma in lieu of whole blood, the specimen may be conducted directly from the reception chambers 736, 738 to the cuvettes 810, 812.

The container 730 of FIG. 35 may be used for a range of enzyme tests as is exemplified by the above discussion. Among other advantages it permits the use of whole blood in the test. In lieu of employing the container as a universal container for the various enzyme tests, a container may be provided with only the specific portions which are needed for the particular enzyme assay.

EXAMPLE 9

An example of the use of the container of FIG. 35 in an enzyme test using a reagent to stop the reaction and simultaneously develop the color will now be considered. This example involves the use of thymolphthalein monophosphate as substrate in the alkaline phosphatase reaction. Piercing element 734 is employed to fracture membranes 732, 746 and 20 microliters of blood serum is introduced into reception chamber 738. Reception chamber 738 has been prepacked with 200 microliters of 2-amino-2-methyl-1-propanol, 0.35 M pH 10.15 plus $MgCl_2$ and Brij-35 (Hercules Powder). The materials are mixed by agitation of the container. Membrane 748 is then pierced and the container is placed in a heating block colorimeter or otherwise treated at 35° C. and allowed to reach equilibrium with the 35° C. medium. Filtration will be completed through filtration chamber 760. The timed reaction is initiated by removal of vent cover tapes 796, 804. The contents are thereby introduced into blank chamber 786 and test chamber 784 and the container is shaken to mix and a timer is started. The blank chamber 786 contains a 2 mg. $NaOH-Na_2CO_3$ pellet. The test chamber 784 contains a 4 mg. lactose tablet containing 400 micrograms of sodium thymolphthalein. After a 10 minute incubation period, vent covers 834, 840 are removed and the liquids of the chambers flow through conduits 820, 822 to fill cuvettes 812, 810, which are then shaken vigorously. Blank cuvette 812 contains 300 micrograms sodium thymolphthlein monophosphate in a 3 mg. lactose unit. The test cuvette 810 contains a 1.5 mg. $NaOH-Na_2CO_3$ buffer tablet to stop the reaction and form the indicating color. The blue color may be visually match against a color card standard, or measured with a colorimeter using a 590 nm. filter. Enzyme units may then be determined by standard control and calibration procedures.

Figure 36:
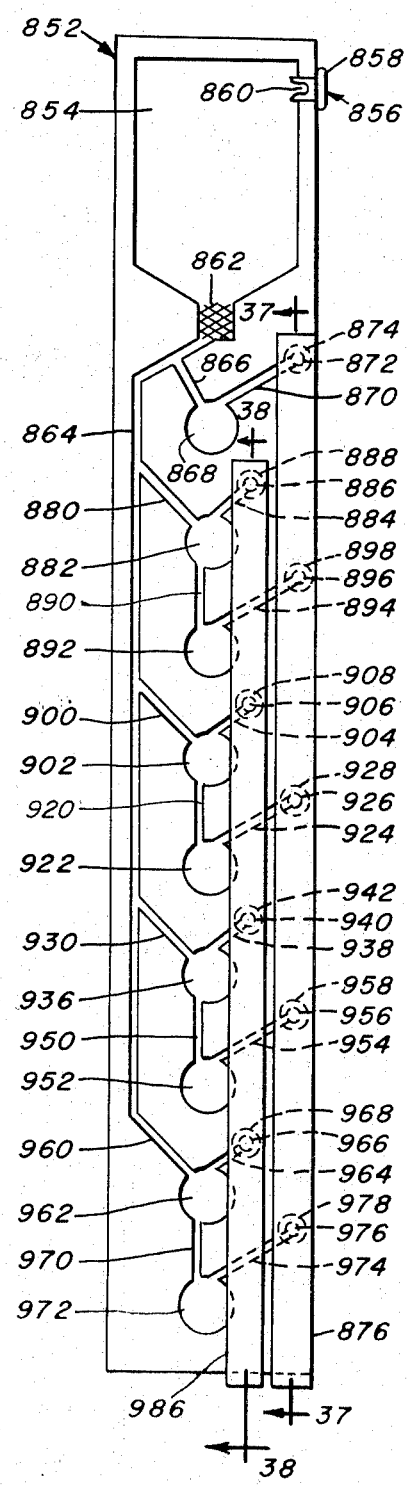
FIG. 36 is a front elevational view of a form of test container for use in immunologically based titrations.
Figure 37:
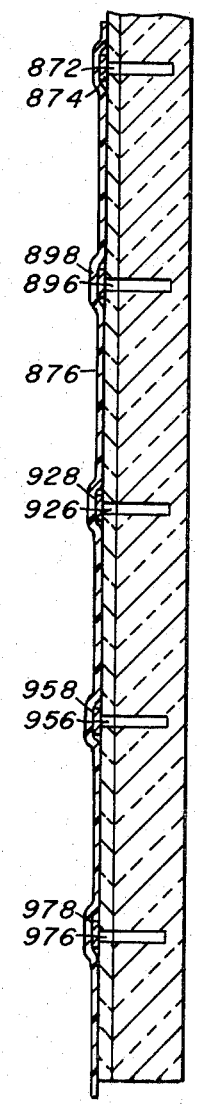
FIG. 37 is a cross sectional view of the container of FIG. 36 taken through 37—37 and showing a first series of vents.
Figure 38:
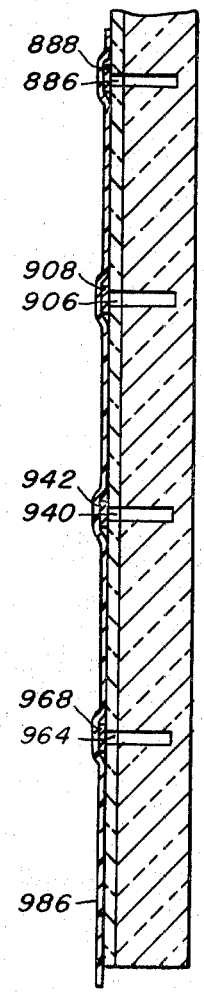
FIG. 38 is a cross sectional view of the container of FIG. 36 taken through 38—38 and showing a second series of vents.

The test container assembly of FIGS. 36 through 38 may be employed in hemagglutination and hemagglutination inhibition tests, such as a hemagglutination assay for antigen and antibody associated with viral hepatitis. Other titrations, such as those for rubella, heterophile antibodies, streptococcal hemolysins or other immunologically based titrations, may be performed with this system. Container 852 has a reception chamber 854 which is in communication with the container exterior. A stopper 856 having a head portion 858 and a shank defining recess 860 is provided as a closure. In a test for Australian hepatitis associated antigen (HAA) preferably employing a blood serum or plasma specimen, the reception chamber 854 receives a specimen properly diluted with a suitable diluent. Blood solution leaving reception chamber 854 will pass through filtration chamber 862 and enter header 864 for delivery to a series of chambers which are provided with substantially the same quantities of antibody against hepatitis associated antigen (HAA) in different quantities of liquid. As the chambers have the same volume capacity, different volumes of the blood specimen will be received in each one and different serum or plasma concentrations will result in each chamber.

Turning more specifically to the container 852 of FIG. 36, there is shown an upper control chamber 868 which is provided with a quantity of hepatitis associated antigen coated onto erythrocytes according to Vyas and Shulman's method in order to indicate nonspecific agglutination. Test fluid is received into control chamber 868 through conduit 866 which is connected to fluid header 864. Control chamber 868 has a vent 70 provided with a vent opening 872 which is an opening in the container cover. (See FIG. 37.) The opening 872 is covered by a tape section 874 which is gas permeable, but liquid impermeable. This will permit the discharge of venting air, but resist discharge of liquid therethrough. In order to provide for control of initiation of flow, a gas and liquid impermeable tape 876 which is removable is secured in overlying position with respect to tape 874. In the preferred form, the cover tape 876 is provided as a strippable film which is adapted to be removed as a unit. If desired, individual removable cover tapes for each vent opening may be provided in lieu of unitary tape 876.

While for ease of description a container having four subsystems will be considered, different numbers of subsystems may be employed, if desirebd for a particular test. Considering now the first of the four illustrated subsystems, header 864 provides test fluid to upper chamber 882 through branch conduit 880. Upper chamber 884 will have a quantity of antibody against hepatitis associated antigen substantially equal to the quantity provided in the other upper chambers to be described below, but each will contain different quantities of liquid and as a result receive a different volume of the test fluid. Upper chamber 882 has a vent 884 with a vent opening 886 in the cover of the container 852 provided with an overlying tape or disc 888 composed of a gas permeable, liquid impermeable material. A cover tape 986 of a gas and liquid impermeable material is strippable and is secured in overlying relationship to tape disc 888. As is shown in FIG. 38, vent opening 886 is in a row of vents which is transversely displaced from vent opening 872 and its row of vent openings. Upper chamber 882 is connected to underlying lower chamber 892 by conduit 890. Lower chamber 892 contains lyophilized hepatitis associated antigen coated on erythrocytes. Lower chamber 892 has a vent 894 provided with a vent opening 896 and a gas impermeable tape disc 898. As is shown in FIG. 37, tape disc 898 underlies gas impermeable tape 876. When it is desired to initiate flow into upper chamber 882, vent cover tape 986 is raised to permit exposure of tape disc 888 and exhaust of air and gasses therethrough. When it is subsequently desired to initiate flow to lower chamber 892, venting is effected by raising vent cover tape 876 to expose tape disc 898. Raising of vent cover tape 876 will be initiated after mixing has been effected in upper chamber 882.

The second through fourth subsystems illustrated are substantially identical in operation, but have different concentrations as a result of the receipt of different volumes of the test fluid. In the second system, upper chamber 902 receives the test fluid from header 864 through conduit 900. Chamber 902 has a vent 904 and vent opening 906 covered by gas permeable, liquid impermeable tape or disc 908. Tape 908 underlies the gas impermeable tape 986. Lower chamber 922 receives mixed test fluid from upper chamber 902 through conduit 920. Lower chamber 922 has vent 924 and vent opening 926 which underlies gas permeable disc 928. Gas permeable disc 928 is covered by gas impermeable strippable tape 876. It will, therefore, be appreciated that when it is desired to initiate flow from header 864 into upper chambers 882, 902 one may simply strip tape 986 to expose tape discs 888, 908 and permit exhaust of air from upper chambers 882, 902 and flow of test fluid into the same. After mixing, when it is desired to transfer the mixed fluid to the lower chambers 892, 922 vent cover tape 876 may be removed to expose tape discs 898, 928 to permit exhaust of air from lower chambers 892, 922 and permit flow into the same.

The third subsystem has an upper chamber 936 connected with the test fluid header 864 by conduit 930. Upper chamber 936 has a vent 938 and vent opening 940 covered by gas permeable, liquid impermeable tape disc 942 which in turn is covered by tape 986. Lower chamber 952 is connected with upper chamber 936 by conduit 950. Lower chamber 952 has vent 954 and vent opening 956 covered by gas permeable tape 958 which in turn is covered by tape or film 876. The venting and flow into respective chambers 936, 952 may be coordinated with the counterpart flow in the other systems by raising tapes 986, 876, respectively.

While it is preferred to provide unitary elongated tapes or films 876, 986 to facilitate ease of venting and flow initiation, segmented removable cover tapes may be employed, if desired.

The fourth subsystem has an upper chamber 962 connected with header 864 through conduit 960. Vent 964 has vent opening 966 covered by gas permeable, liquid barrier tape or film 968 which is in turn covered by liquid and gas barrier tape or film 986. Lower chamber 972 is connected with upper chamber 962 through conduit 970. Lower chamber 972 has a vent 974 and opening 976 which is covered by gas permeable tape 978. This tape 978 underlies tape 876.

The serial dilution system of FIGS. 36 through 38 provides for upper chambers which have different concentrations of antibody as a result of the presence of a substantially identical amount of antibody, but different amounts of initial liquid in each upper chamber. As a result of all upper chambers being of the same volume capacity, a different amount of diluted blood fluid specimen will be received in each one, with the more dilute antibody solutions receiving a smaller volume of diluted blood specimen. The upper chambers serve as antigen-antibody neutralization chambers. Antibody in excess of that utilized to combine with any antigens present in the specimen will agglutinate the coated erythrocytes present in lyophilized form in the lower chambers providing a liter of the HAA. The absence of agglutination in the control chamber 868 serves as a control to rule out any nonspecific agglutination directed against the erythrocytes themselves, i.e., isoantibodies. The container 852 should be placed in a substantially horizontal position in the presence of suitable lighting in order to examine for agglutination in the various chambers with the naked eye, a magnifier or other appropriate viewing system.

Another means of employing the structures of FIGS. 36 through 38 in titration of HAA is to place different quantities of lyophilized antibody in the respective upper chambers with weights increasing in successive upper chambers proceeding downwardly within the container. The upper chambers are packaged without liquid and the test liquid will be provided in equal volumes to the upper chambers.

Referring once again to FIG. 36, an advantageous alternate means of introducing small quantities of liquid specimens will be described. The opening which connects the container exterior with the reception chamber 854 may be coated with a suitable material which will render this portion of the naturally hydrophobic container material hydrophilic. Such a coating might consist of a polyethylene glycol, such as that sold under the trade designation "Carbowax" (Union Carbide). In using such an embodiment, the stopper 856 is removed and a source of the body liquid is placed in contact with the container opening. The liquid will wet the hydrophilic opening defining wall, but will not wet the remaining hydrophobic container portions. As a result, a predetermined volume of the specimen liquid will be provided in the opening. Repositioning of the stopper will urge the specimen into reception chamber 854. If desired, an exteriorly disposed cover tape, such as a pressure sensitive tape, may be employed to cover the opening in lieu of stopper 856. In order to avoid establishment of an undesired pressure differential across the container opening during liquid specimen filling, it is desirable to vent the container either by opening an existing vent or by providing a separate vent opening in the reception chamber 854.

In many instances, the miniaturized analytical test container of this invention will provide a test result on the basis of a visual inspection of the cuvettes, with or without the use of magnification and/or independent comparison standards. The test containers of this invention are uniquely suited for instrument readout of test results, as by use of a conventional or miniaturized single or double beam colorimeter. As a result of the configuration of the cuvettes and the preferred use of substantially rigid container materials, the cuvettes provide a desired fixed reference for instruments, such as a colorimeter. A colorimeter is an instrument which passes a light beam through a specimen, measures the quantity of filtered light energy transmitted through the specimen and provides a readout indicative of the concentration of the specimen. In addition to colorimeters other instruments may be employed with the analytical test containers of this invention. For example, spectrophotometric instrumentation, with or without rate meters, and temperature control devices with analogue or digital readouts in absorbance or concentration units may be employed. Also, fluorometers, nephelometers and direct or oscillometric conductivity meters may be used.

The materials employed in making the analytical test container of this invention may be completely or selectively dyed with a dye or combination of dyes which will allow passage of only a selected wavelength band of monochromatic light through the cuvettes, thus eliminating the need for an external filter. The dye material may conveniently be incorporated into the material out of which the container tray or cover or portions thereof such as the cuvettes will be made. In this fashion selective filtration of the light may be obtained even though a broad band light source, such as an incandescent lamp, is employed. Such a system would eliminate the need to select and employ special light sources and/or the need for special filters. Also, potential problems from stray light sources can be reduced in this fashion.

Another distinct advantage of the systems of this invention in respect of blood testing is that it permits the use of extremely small quantities of blood, frequently on the order of 0.5 to 50 microliters, while providing accurate and reliable results. The systems also permit a greater range of reliable diagnostic tests to be performed on pediatric, geriatric or acutely ill patients. The use of such small quanties makes the collection less painful, traumatic and axiety producing upon the patient than current large volume procedures.

While for clarity of illustration in a number of elevational views chambers of covered containers have been shown in solid line rather than dotted form, it will be appreciated that a transparent cover is positioned thereover and the use of solid lines is to merely illustrate the size and definition of the chambers.

While a number of the preferred forms of reception chamber seals and dividers have been shown and described in detail herein, it will be appreciated that other form of seals may be employed without departing from the scope of the invention. For example, in lieu of the piston type displaceable seal 204 or seal 264 of FIGS. 19 and 19a, respectively, one might employ a web-like slidable divider which extends transversely across substantially the entire width of the container and has a free end received within a groove defined by the container tray wall. Alternatively, such a web could terminate at a stub wall such as wall 210 of FIG. 19. Removal and seal opening could be effected by manual engagement of a projecting gripping portion such as head seal 204 in FIG. 19. Other constructions will apparent those skilled in the art.

While for purposes of illustration, certain specific forms of analytical tests have been exemplified in connection with certain embodiments of the invention, it will be appreciated that the invention is not so limited. The various embodiments and features of the invention are adapted for a wide variety of end uses in tests upon a wide range of specimen materials in clinically evaluating the specimen materials both qualitatively and quantitatively for a wide range of constituent characteristics. The systems illustrated herein provide the best mode of practicing the invention of which applicant is aware, but as has been illustrated above, number of features are interchangeable and a variety of tests may be performed in a given system. For example, the use of maxing spheres, parallel or sequential flow, different closures, single or multiple systems, different venting means, the simultaneous use of standard and test subsystems, different internal seals and other features of the invention may be incorporated or withdrawn from a specific embodiment as needs require, so long as the basic miniaturized fully integrated structural system of the disposable analytical test containers of this invention are preserved. Within this context, particular emphasis has been placed upon a preferred group of embodiments employing cuvettes adapted for use with colorimeter readout and another group employing visual evaluation such as the visual agglutination tests. The miniaturized analytical test container structures of this invention provide all the above described benefits while permitting the use of a wide range of procedures including conventional analytical chemical procedures as well as high performance, otherwise expensive, procedures in an economic, convenient and reliable fashion by unskilled as well as skilled personnel.

It will, therefore, be appreciated that the disposable miniaturized analytical test containers of this invention provide a fully integrated clinical testing system which is adapted for use with a wide range of clinical tests in a wide range of test specimens. The systems are reliable, provide prompt results and permit rapid and accurate test results in the home, in the operating room, at a patient's bedside and at other locations which are remote from clinical laboratories. In addition, this invention permits rapid and fully accurate medical evaluation, diagnosis and treatment having economic, prompt and accurate patient monitoring as an integral part of the system. The systems may be economically manufactured, employ only small quantities of reagent materials and effect greater economy as a result and have a long shelf life with minimum storage space required. All of this may be accomplished by employing conventional molding technology, conventional filling and packaging concepts and employing accepted clinical laboratory chemistry practices but providing the numerous advantages which have been outlined above.

Whereas particular embodiments of the invention have been described above for purposes of illustration, it will be evident to those skilled in the art that numerous variations of the details may be made without departing from the invention as defined in the appended claims.

I claim:

1. A body fluid analytical test container comprising
   a reception chamber for receipt of a specimen,
   said reception chamber containing at least one of a reagent or a diluent,
   first access means for connecting the container interior with the container exterior,
   first seal means preventing communication between at least a major portion of said reception chamber and said container exterior,
   a separation chamber disposed adjacent said reception chamber,
   a first cuvette,
   a second cuvette,
   at least one of said first and second curvettes containing a predetermined quantity of reagent,
   conduit means for permitting specimen flow from said separation chamber to said first and second cuvettes,
   vent means independent of said conduit means having at least one elongated vent passageway communicating with at least one said cuvette and having an opening adjacent said container exterior, and
   a substantially rigid unitary container body cooperating with a cover member to define said reception chamber, said separation chamber, said first and second cuvettes, said conduit means and said elongated vent passageway whereby introduction of a test specimen into said reception chamber will permit admixture of said specimen with said diluent or reagent, passage of said treated specimen through said separation chamber and transfer of the portion of said treated specimen emerging from said separation chamber to said first and second cuvettes with said elongated vent passageways facilitating said specimen flow through said conduit means to said first and second cuvettes while resisting entry of undesired foreign matter into said cuvettes.

2. The analytical test container of claim 1 including
   said first access means including first passageway means, and
   second seal means separating said reception chamber from said separation chamber.

3. The analytical test container of claim 1 including
   a web portion defining a portion of an exterior wall of said container and a pressure sensitive adhesive sealingly securing said web portion to said container body,
   said web portion being a film which forms at least a portion of said cover, and
   said pressure sensitive adhesive permitting partial removal of said film portion to create a specimen introducing opening in said container and subsequent reclosure of said container.

4. The analytical test container of claim 1 including
   said first access means including first passageway means,
   said separation chamber being a filtration chamber containing filter material,
   said conduit means including second passageway means connecting said filtration chamber with said first cuvette,
   said conduit means including third passageway means connecting said first cuvette with said second cuvette,
   said vent means including elongated fourth and fifth vent passageway means for venting said first and second cuvettes, and
   said rigid container body being elongated and cooperating with said cover to define said second, third and fourth passageway means, whereby said test specimen will be transported under the influence of gravity from said filtration chamber to said first and second cuvettes by independent specimen transporting passageways and venting will be effected by another independent passageway.

5. The analytical test container of claim 4 including
   said first seal means having a displaceable sealing element.

6. The analytical test container of claim 4 including
   said test container having a generally rectangular peripheral configuration in plan,
   said test container having an upper end, a lower end, a front face, a rear face and two sides,
   said reception chamber disposed adjacent said upper end,
   said filtration chamber disposed below said reception chamber,
   said first and second cuvettes disposed closer to said lower end than to said upper end, and
   said vent opening disposed at a level above the lower end of said reception chamber.

7. The analytical test container of claim 1 including
   said first access means including first passageway means, and
   said first seal means having a closure element extending into said first passageway means.

8. The analytical test container of claim 4 including said first seal means including a frangible divider wall formed integrally with said container.

9. The analytical test container of claim 4 including said container body portion being elongated with a generally rectangular peripheral configuration,
said container having a substantially uniform external thickness throughout its longitudinal extent,
said container having a length of about 4 to 12 centimeters,
said container having a width of about 8 to 25 millimeters,
said container having a thickness of about 2 to 15 millimeters, and
said first passageway means includes a bore in said container body portion connecting said reception chamber with the exterior of said container for introduction of a specimen into said reception chamber.

10. The analytical test container of claim 4 including second seal means separating said reception chamber from said separation chamber,
said fourth passageway means including an elongated vent passageway connecting said second cuvette with said container exterior,
vent closure means covering said vent conduit adjacent the exterior of said container, and
said vent closure means having a film closure of substantially gas permeable, substantially liquid impermeable material.

11. The analytical test container of claim 10 including a removable vent cover of substantially gas and liquid impermeable material secured over said vent film closure.

12. The analytical test container of claim 7 including said first passageway means including a container opening,
said closure element having an elongated body,
said elongated body having a portion of generally complementary cross sectional configuration with respect to said container opening,
said elongated body having at least one specimen receiving recess for receipt of a predetermined quantity of a specimen and delivery of said specimen into the container interior, and
said elongated body having a venting channel adapted to permit communication between the container exterior and the container interior with said closure extending into said container.

13. The analytical test container of claim 12 including said closure element formed integrally with a portion of said container, and
frangible connecting means joining said closure element to said portion of said container.

14. The analytical test container of claim 12 including said elongated closure body being an elongated rod,
second seal means separating said reception chamber from said separation chamber, and
the inner free end of said elongated rod having means for destroying the integrity of the seal provided by said second seal means.

15. The analytical test container of claim 12 including a sealed reagent containing frangible envelope disposed within said reception chamber, and
said opening creating means of said rod including a tapered end.

16. The analytical test container of claim 9 including divider means subdividing said reception chamber into at least two reception chamber compartments.

17. The analytical test container of claim 9 including mixing means disposed within said first and second cuvettes.

18. The analytical test container of claim 2 including said second seal means including a displaceable sealing element.

19. The analytical test container of claim 2 including said second seal means including a frangible divider web formed integrally with said container.

20. The analytical test container of claim 14 including said second seal means including a frangible membrane, and
said opening creating means of said rod including a tapered piercing rod.

21. The analytical test container of claim 16 including said divider means being frangible webs formed integrally within said container.

22. The analytical test container of claim 17 including mixing means disposed within said reception chamber.

23. The analytical test container of claim 22 including said mixing means disposed within said cuvettes and said reception chamber having inert freely movable mixing elements disposed within said cuvettes and said reception chamber.

24. The analytical test container of claim 2 including said first seal means having a frangible seal between said container opening exterior and said reception chamber, and
said second seal means having a frangible seal between said reception chamber and said separation chamber.

25. The analytical test container of claim 9 including said body portion having a first body section secured to a second body section,
said first body section being a substantially continuous web, and
said second body section having a generally web-like configuration provided with a number of openings at the locations of said reception chamber, filtration chamber and cuvettes.

26. The analytical test container of claim 9 including said second passageway means connecting a lower portion of said filtration chamber with an upper portion of said first cuvette, and
said third passageway means connecting an upper portion of said first cuvette with an upper portion of said second cuvette.

27. The analytical test container of claim 26 including said fourth venting passageway means including a passageway emerging from the upper portion of said second cuvette.

28. The analytical test container of claim 27 including said fourth venting passageway means extending to the container exterior at a level higher than the lower end of said reception chamber, and
closure means covering said bent means at said container exterior.

29. The analytical test container of claim 9 including at least one mixing element disposed within said first cuvette,
at least one mixing element disposed within said second cuvette,
a mixing element receiving recess disposed within the lower portion of said first cuvette, and
a mixing element receiving recess disposed within the lower portion of said second cuvette.

30. The analytical test container of claim 9 including a depot reservoir disposed within said second passageway means, and
a depot reservoir disposed within said third passageway means.

31. The analytical test container of claim 12 including said container having a second reception chamber separated from the first reception chamber,
bore means between said second reception chamber and the exterior of said container,
closure means closing said bore means,
a second filtration chamber adjacent said second reception chamber,
a third cuvette,
fifth passageway means connecting said second filtration chamber and said third cuvette,
a fourth cuvette, sixth passageway means connecting said third cuvette with said fourth cuvette, and
a venting passageway connected to said fourth cuvette.

32. The analytical test container of claim 31 including said fourth cuvette vent passageway communicating with a common vent opening with said fourth passageway vent means of said first or second cuvette.

33. The analytical test container of claim 31 including
a depot reservoir disposed within said fifth passageway means,
a depot reservoir disposed within said sixth passageway means, and
mixing means disposed within said cuvettes.

34. The analytical test container of claim 7 including
said first passageway means being a bore through one exterior wall of said container, and
said closure element being a resilient element in compressively deformed securement within said bore.

35. The analytical test container of claim 5 including
said first seal means having a displaceable sealing element in the form of an elongated web-like element adapted to be at least partially moved in destroying said seal.

36. The analytical test container of claim 2 including
a reaction chamber disposed within said conduit means, and
vent means communicating with said reaction chamber.

37. The analytical test container of claim 36 including
said conduit means having first, second and third liquid channels,
said first liquid channel connecting said separation chamber with said reaction chamber,
said second liquid channel connecting said reaction chamber with said first cuvette, and
said third liquid channel connecting said first cuvette with said second cuvette.

38. The analytical test container of claim 36 including
said container having at least two subsystems each consisting of one said reaction chamber, one said reaction chamber vent, said first, second and third liquid channels and said cuvette vent means.

39. The analytical test container of claim 1 including
said first access means including first passageway means,
said conduit means having first conduit means connecting said separation chamber directly with said first cuvette,
said conduit means having second conduit means connecting said separation chamber directly with said second cuvette,
a first vent being an elongated passageway connecting said first cuvette and said container exterior,
a second vent being an elongated passageway connecting said second cuvette and said container exterior, and
said substantially rigid elongated container body cooperating with said cover to define said first and second conduit means and said elongated first and second vent passageways, whereby with said test container angularly or directly vertically oriented a test specimen emerging from said separation chamber will be transported by independent conduit means to said first and second cuvettes under the influence of gravity with said cuvettes being independently vented by said elongated first and second vent passageways.

40. The analytical test container of claim 39 including
said separation chamber being a filtration chamber,
said first passageway means including a container bore,
said first seal means including a frangible seal,
second seal means between said filtration chamber and said reception chamber,
said container having a length of about 4 to 12 centimeters,
said container having a width of about 8 to 25 millimeters, and
said container having a thickness of about 2 to 15 millimeters.

41. The analytical test container of claim 40 including
said closure means being an elongated closure rod extending into said container bore,
one portion of said closure rod of substantially the same cross sectional configuration as said container bore and serving as a closure therefor, and
a second portion of said rod having a specimen receiving recess for receipt of a specimen exteriorly of said container and delivery of same into said reception chamber.

42. The analytical test container of claim 40 including
frangible seal means disposed between the exterior of said container and said reception chamber, and
frangible divider means dividing said reception chamber into at least two compartments.

43. The analytical test container of claim 42 including
said first seal means including a displaceable seal.

44. The analytical test container of claim 39 including
a second reception chamber within said container separated from the first reception chamber,
bore means through which a specimen may be introduced into said second reception chamber from the exterior of said container,
a second separation chamber,
second separation chamber seal means separating said second reception chamber from said second separation chamber,
third and fourth cuvettes separated from said first and second cuvettes,
third conduit means connecting said second separation chamber with said third cuvette,
fourth conduit means connecting said second separation chamber with said fourth cuvette,
third vent means connected with said third cuvette, and
fourth vent means connected with said fourth cuvette.

45. The analytical test container of claim 39 including
vent cover means closing said first and second vents, and
said vent cover means including a substantially gas permeable, substantially liquid impermeable material.

46. The analytical test container of claim 45 including
a removable substantially gas and liquid impermeable seal secured over said vent cover means.

47. The analytical test container of claim 39 including
inert mixing means disposed within said cuvettes, and
said cuvettes having recesses for receipt of at least a portion of said inert mixing means.

48. The analytical test container of claim 40 including
said second seal means having an integrally formed frangible membrane.

49. The analytical test container of claim 41 including
said second seal means having a displaceable sealing element.

50. The analytical test container of claim 40 including
a first reaction chamber disposed within said first conduit means,
first reaction chamber vent means communicating with said first reaction chamber,
a second reaction chamber disposed within said second conduit means, and
second reaction chamber vent means communicating with said second reaction chamber.

51. The analytical test container of claim 50 including
a first reagent depot reservoir disposed within said first conduit means, and
a second reagent depot reservoir disposed within said second conduit means.

52. The analytical test container of claim 2 including
a reaction chamber disposed within said conduit means,
reaction chamber vent means communicating with said reaction chamber,
said conduit means having first and second conduits, said first conduit connecting said reaction chamber with one said cuvette, said second condut connecting said reaction chamber with said other cuvette, and said cuvette vent means communicating with each said cuvette.

53. The analytical test container of claim 52 including each said vent opening provided with an inner closure and a removable outer closure, said inner closure is permanently secured to said container, and said outer closure is a removably secured gas and liquid impermeable film.

54. The analytical test container of claim 52 including a first processing chamber disposed within said first conduit means intermediate said reaction chamber and said first cuvette, first processing chamber vent means associated with said first processing chamber, a second processing chamber disposed within said second conduit intermediate said reaction chamber and said second cuvette, and second processing chamber vent means associated with said second processing chamber.

55. The analytical test container of claim 54 including removable vent covers on said first and second processing chamber vent means.

56. The analytical test container of claim 39 including said container body portion formed as a unitary molded article composed of a substantially hydrophobic material, and said bore defined by a coated substantially hydrophilic container surface, whereby a predetermined quantity of liquid specimen will be received in said bore.

57. The analytical test container of claim 39 including said container body having a first substantially continuous web secured to at least one additional body section having voids at the locations of said chambers and cuvettes.

58. The analytical test container of claim 40 including said first vent emerging from the upper portion of said first cuvette, said first conduit connected to said first cuvette closely adjacent said first vent, said second vent emerging from the upper portion of said second cuvette, and said second conduit connected to said second cuvette closely adjacent said second vent.

59. An analytical test container closure member comprising an elongated body having a shank portion with an inner end adapted to be introduced into the interior of said test container and an outer end adapted to be disposed exteriorly of said test container, at least one exteriorly open specimen receiving recess disposed within said shank portion and adapted to hold a predetermined quantity of a specimen, seal destroying means formed within said shank portion at said inner end, and an elongated venting portion disposed within said shank portion intermediate said specimen receiving recess and said shank portion outer end.

60. The closure member of claim 59 including said specimen receiving recess being an elongated capillary passageway.

61. The closure member of claim 59 including a transversely extending head portion projecting from said outer end of said shank portion.

62. The closure member of claim 59 including said seal destroying means including a piercing end.

63. The closure member of claim 59 including said elongated venting channel is outwardly open throughout its longitudinal extent.

64. The closure member of claim 59 including said closure member is a unitary molded structure, and said closure member shank portion has a substantially uniform cross sectional configuration throughout its length between said outer end and said inner end, except for said specimen receiving recess and said venting channel.

65. The closure member of claim 59 including stop means projecting generally laterally outwardly from said shank portion in order to prevent excessive penetration of said closure shank into said container interior.

66. The closure member of claim 64 including an exteriorly open second specimen receiving recess of different capacity than said first specimen receiving recess, and said first and said second specimen receiving recesses are generally axially oriented and disposed at generally the same axial location on said shank portion.

67. An analytical test container comprising a reception chamber for receipt of a specimen, said reception chamber containing at least one of a reagent or a diluent.

access means between at least a major portion of said reception chamber and the exterior of said test container, closure means closing said access means, a separation chamber, seal means disposed between said reception chamber and said separation chamber, at least two independent test subsystems, each said independent test subsystem having a first cuvette, a second cuvette, cuvette vent means having an opening adjacent the exterior of said container and liquid transporting passageways for transporting test liquid from said separation chamber to said first and second cuvettes, at least one of said first and second cuvettes containing a predetermined quantity of reagent, and a substantially rigid elongated container body cooperating with a cover to define said reception chamber, said separation chamber and said subsystems, whereby a number of independent test subsystems may be supplied with a test specimen from a single reception chamber with flow to said subsystems being effected by vented gravitational flow.

68. The analytical test container of claim 67 including said access means including a first passageway between said reception chamber and said container exterior, and said liquid transporting means includes first liquid transporting means for delivering liquid from said separation chamber to said first cuvette and second liquid transporting means for delivering liquid from said first cuvette to said second cuvette.

69. The analytical test container of claim 67 including said access means including a first passageway between said reception chamber and said container exterior, and said liquid transporting means includes first liquid conduit means for delivering liquid from said separation chamber to said first cuvette and second liquid conduit means for delivering liquid from said separation chamber to said second cuvette.

70. The analytical test container of claim 67 including at least one said independent subsystem having a processing chamber disposed in said liquid transporting means intermediate said separation chamber and said first and second cuvettes, and processing chamber vent means connected to the exterior of said container.

71. The analytical test container of claim 70 including at least one of said independent test subsystems having at least one reagent depot reservoir disposed intermediate said separation chamber and said first and second cuvettes.

72. The analytical test container of claim 70 including said processing chamber vent means having an opening, a film closure disposed over said processing chamber vent opening, said cuvette vent means having at least one vent opening, and a film closure disposed over said cuvette vent opening.

73. The analytical test container of claim 72 including said film closures are composed of a substantially gas permeable, substantially liquid impermeable material, and a removable outer closure disposed over said film closure composed of a substantially gas and liquid impermeable material.

74. The analytical test container of claim 70 including at least one reagent depot reservoir disposed within said liquid transporting means intermediate said separation chamber and said processing chamber.

75. An analyticaly body fluid test container comprising a reception chamber for receipt of a specimen, said reception chamber containing at least one of a reagent or a diluent, access means connecting said reception chamber with the exterior of said container, closure means closing said access means, a separation chamber connecting with said reception chamber, at least two independent test sectors each having a test chamber, each said test sector containing a predetermined quantity of at least one of a reagent or a diluent, conduit means connecting said separation chamber with said test chambers, each said test sector having an upper test chamber and a lower test chamber, said conduit means connected to said upper chamber of each said test sector, passageway means connecting said upper and lower chambers, vent means including elongated passageways communicating with each said test sector, and a substantially rigid unitary container body cooperating with a cover member to define said reception chamber, said separation chamber, said test sectors and said vent means.

76. The analytical test container of claim 75 including said access means including a bore, said test container being an elongated plate-like container having an upper end, a lower end, a front face, a rear face and a pair of opposed sides, said reception chamber disposed adjacent said upper end, and said bore extending through a peripheral wall of said container.

77. The analytical test container of claim 75 including said separation chamber being a filtration chamber, said filtration chamber having filter means for separating blood into two constituents, and said filtration means having openings for permitting passage of blood serum or plasma therethrough while resisting the passage of blood clots or cells therethrough.

78. The analytical test container of claim 75 including said conduit means having a header passageway originating at said separation chamber, and said conduit means having branch passageways operatively connecting said header passageway with said upper chambers.

79. The analytical test container of claim 75 including said access means including a specimen introducing bore, said bore defined by a container wall, said bore defining container wall being coated with a substantially hydrophilic material, and the adjacent container interior portions being hydrophobic, whereby said bore will receive a predetermined quantity of a liquid specimen for transfer to the container interior.

80. The analytical test container of claim 75 including elongated first vent means for venting said upper chambers, and second vent means for venting said lower chambers.

81. The analytical test container of claim 80 including said first vent means having for at least two said upper chambers a vent passageway connecting said upper chambers with the container exterior, and said second vent means having for at least two said lower chambers a vent passageway connecting said lower chambers with the container exterior.

82. The analytical test container of claim 81 including substantially gas permeable, substantially liquid impermeable covers on the first and second vent openings, and removable substantially gas and liquid impermeable vent closures over said vent covers.

83. The analytical test container of claim 82 including a first unitary vent closure secured over all said gas permeable covers on said first vent openings, and a second unitary vent closure secured over all said gas permeable covers on said second vent openings.

84. The analytical test container of claim 75 including a control chamber disposed generally adjacent said separation chamber, a fluid channel connecting said control chamber with said conduit means, control chamber vent means connecting said control chamber with the container exterior, and cover means over the control chamber vent opening.

85. An analytical body fluid test container comprising a reception chamber for receipt of a specimen, said reception chamber containing at least one of a reagent or a diluent, a filtration chamber, first conduit means connecting said reception chamber with said filtration chamber, an immobilized enzyme processing reaction chamber and a blank reaction chamber, second conduit means connecting said filtration chamber with said reaction chambers, a first cuvette, third conduit means connecting said immobilized enzyme reaction chamber with said first cuvette, a second cuvette, at least one said cuvette containing a predetermined quantity of a reagent, fourth conduit means connecting said blank reaction chamber with said second cuvette, first vent means having an elongated passageway connecting said first cuvette, with the container exterior, second vent means having an elongated passageway connecting said second cuvette with the container exterior, and a substantially rigid unitary elongated container body cooperating with a cover member to define said reception chamber, said filtration chamber, said reaction chambers, said cuvettes, said conduit means and said vent passageways, whereby a test specimen introduced into said reception chamber may be admixed with said reagent or diluent, with subsequent passage thereof through said filtration chamber and reaction chambers to said cuvettes being effected by vented gravitational flow through said conduit means.

86. The analytical test container of claim 85 including said first means including first conduit means, an ion exchange chamber disposed within said second conduit means, and a run-off chamber disposed within said second conduit means intermediate said ion exchange chamber and said reaction chambers.

87. The analytical test container of claim 86 including mixing means disposed within said cuvettes, and mixing means receiving recesses defined within the lower portions of said cuvettes.

88. The analytical test container of claim 85 including said first means including first conduit means,
a pair of frangible integrally molded divider walls within said reception chamber,
the openings of said first and second vent means disposed at a level higher than said reaction chambers, and
said vent means having vent passageways emerging generally from the highest portions of said cuvettes.

89. The analytical test container of claim 88 including said third conduit means entering said first cuvette at a position adjacent but lower than said first vent passageway, and
said fourth conduit means entering said second cuvette at a position adjacent but lower than said second vent passageway.

References Cited

UNITED STATES PATENTS

| 3,476,515 | 11/1969 | Johnson et al. | 23—230 R |
| 3,497,320 | 2/1970 | Blackburn et al. | 23—253 X |
| 3,532,470 | 10/1970 | Rochte | 23—253 R |
| 3,540,857 | 11/1970 | Martin | 23—253 X |
| 3,690,836 | 9/1972 | Buissiere et al. | 23—230 B |
| 3,689,224 | 9/1972 | Agnew et al. | 23—253 TP |
| 3,697,227 | 10/1972 | Goldstein et al. | 23—253 TP |

MORRIS O. WOLK, Primary Examiner

R. E. SERWIN, Assistant Examiner

U.S. Cl. X.R.

23—292; 206—47 A

UNITED STATES PATENT OFFICE
CERTIFICATE OF CORRECTION

Patent No. 3,799,742           Dated March 26, 1974

Inventor(s)           Charles M. Coleman

It is certified that error appears in the above-identified patent and that said Letters Patent are hereby corrected as shown below:

| | |
|---|---|
| Column 1, line 2 | Change "799,742" to --3,799,742-- |
| Column 2, line 7 | Change "addtion" to --addition-- |
| Column 2, line 30 | Change "remain" to --remains-- |
| Column 4, line 46 | Change "FIGURE" to --FIG.-- |
| Column 4, line 73 | Change "sweeat" to --sweat-- |
| Column 6, line 69 | After "ionomer" delete "," |
| Column 7, line 59 | Change "speiimen" to --specimen-- |
| Column 9, line 46 | Change "body" to --both-- |
| Column 9, line 71 | Change "0.33 M" to --0.033 M-- |
| Column 11, line 13 | Change "anion" to --an ion-- |
| Column 13, line 14 | Change "30" to --300-- |
| Column 13, line 65 | Change "326" to --316-- |
| Column 15, lines 21-22 | Change "structual" to --structural-- |
| Column 15, line 22 | Change "wtih" to --with-- |
| Column 17, line 44 | Change "oher" to --other-- |
| Column 19, line 59 | Change "curettes" to --cuvettes-- |

UNITED STATES PATENT OFFICE Page 2
CERTIFICATE OF CORRECTION

Patent No.  3,799,742       Dated  March 26, 1974

Inventor(s)         Charles M. Coleman

It is certified that error appears in the above-identified patent and that said Letters Patent are hereby corrected as shown below:

| | |
|---|---|
| Column 22, line 5 | Change "70" to --870-- |
| Column 22, line 20 | Change "desirebd" to --desired-- |
| Column 24, line 51 | Change "axiety" to --anxiety-- |
| Column 25, line 12 | Change "maxing" to --mixing-- |
| Column 28, line 48 | Change "bent" to --vent-- |
| Column 31, line 3 | Change "condut" to --conduit-- |
| Column 31, line 31 | Before "and" insert the following: --said first passageway means including a bore in said container body portion connecting said reception chamber with the exterior of said container for introduction of a specimen into said reception chamber,-- |
| Column 32, line 17 | After "analytic" insert --body fluid-- |
| Column 32, line 30 | Before "cuvette" (third occurrence) insert --elongated-- |
| Column 32, line 30 | After "vent" insert --passageway-- |
| Column 33, line 17 | Change "analyticaly" to --analytical-- |

Signed and sealed this 11th day of February 1975.

(SEAL)
Attest:

RUTH C. MASON
Attesting Officer

C. MARSHALL DANN
Commissioner of Patents
and Trademarks